US010839760B2

(12) United States Patent
Tamaki

(10) Patent No.: US 10,839,760 B2
(45) Date of Patent: Nov. 17, 2020

(54) DISPLAY DEVICE

(71) Applicant: Japan Display Inc., Tokyo (JP)

(72) Inventor: Masaya Tamaki, Tokyo (JP)

(73) Assignee: Japan Display Inc., Tokyo (JP)

( * ) Notice: Subject to any disclaimer, the term of this patent is extended or adjusted under 35 U.S.C. 154(b) by 121 days.

(21) Appl. No.: 15/442,032

(22) Filed: Feb. 24, 2017

(65) Prior Publication Data

US 2017/0249910 A1    Aug. 31, 2017

(30) Foreign Application Priority Data

Feb. 25, 2016   (JP) .................................. 2016-033989

(51) Int. Cl.
*G09G 3/36*    (2006.01)
*G02F 1/1341*    (2006.01)
(Continued)

(52) U.S. Cl.
CPC ......... *G09G 3/3607* (2013.01); *G02F 1/1341* (2013.01); *G02F 1/13439* (2013.01);
(Continued)

(58) Field of Classification Search
CPC ............... G09G 3/3607; G09G 3/3648; G09G 2300/026; G09G 2300/0413;
(Continued)

(56) References Cited

U.S. PATENT DOCUMENTS

2007/0070274 A1*  3/2007  Yu .................... G02F 1/133555
                                                          349/114
2010/0265224 A1* 10/2010  Cok .................... G09G 3/3266
                                                          345/206
(Continued)

FOREIGN PATENT DOCUMENTS

JP     2001-013524 A    1/2001
JP     2010-048918 A    3/2010
(Continued)

OTHER PUBLICATIONS

Japanese Office Action dated Dec. 10, 2019 corresponding to Japanese Patent Application No. 2016-033989.
(Continued)

*Primary Examiner* — Kent W Chang
*Assistant Examiner* — Sujit Shah
(74) *Attorney, Agent, or Firm* — Michael Best & Friedrich LLP

(57) ABSTRACT

According to one embodiment, a display device includes a main pixel includes a plurality of sub-pixels which exhibit different colors, respectively, a first pixel block adjacent to the main pixel, a second pixel block adjacent to the first pixel block, and electrically connected to the first pixel block, and a driver which drives the main pixel and the first pixel block, wherein the main pixel, the first pixel block, and the second pixel block are located in a display area which displays an image, the display area includes an outer edge portion, the first pixel block is closer to the outer edge portion than the main pixel is, and the second pixel block is closer to the outer edge portion than the first pixel block is, and the second pixel block overlaps the driver in planar view.

18 Claims, 23 Drawing Sheets

(51) Int. Cl.
*G02F 1/1343* (2006.01)
*G02F 1/1362* (2006.01)

(52) U.S. Cl.
CPC .. *G02F 1/134336* (2013.01); *G02F 1/136209* (2013.01); *G09G 3/3648* (2013.01); *G09G 2300/026* (2013.01); *G09G 2300/0413* (2013.01); *G09G 2300/0426* (2013.01); *G09G 2300/0443* (2013.01); *G09G 2300/0842* (2013.01); *G09G 2300/0857* (2013.01); *G09G 2310/0232* (2013.01)

(58) Field of Classification Search
CPC ... G09G 2300/0857; G09G 2310/0232; G09G 2300/0443
See application file for complete search history.

(56) References Cited

U.S. PATENT DOCUMENTS

| | | | | |
|---|---|---|---|---|
| 2011/0194059 | A1* | 8/2011 | Yamazaki | G02F 1/13439 349/138 |
| 2011/0273423 | A1* | 11/2011 | Hsu | G02F 1/1341 345/211 |
| 2012/0307176 | A1* | 12/2012 | Tanaka | G02F 1/1343 349/61 |
| 2013/0077009 | A1* | 3/2013 | Asako | G02F 1/1334 349/42 |
| 2014/0022499 | A1* | 1/2014 | Tamaki | G02F 1/13439 349/106 |
| 2014/0092080 | A1* | 4/2014 | Fukunaga | G09G 3/3696 345/212 |
| 2015/0229844 | A1* | 8/2015 | Yamazaki | G06F 1/1652 348/333.01 |
| 2015/0310801 | A1* | 10/2015 | Lin | G09G 3/3225 345/205 |
| 2015/0362781 | A1* | 12/2015 | Chen | G02F 1/13394 349/106 |
| 2017/0053607 | A1 | 2/2017 | Lin et al. | |

FOREIGN PATENT DOCUMENTS

| | | |
|---|---|---|
| JP | 2012-247662 A | 12/2012 |
| JP | 2015-034998 A | 2/2015 |
| JP | 2015-184668 A | 10/2015 |

OTHER PUBLICATIONS

Chinese Office Action dated Apr. 2, 2020, for the corresponding Chinese Application No. 201710105919.0, with machine English translation provided by the Global Dossier.

* cited by examiner

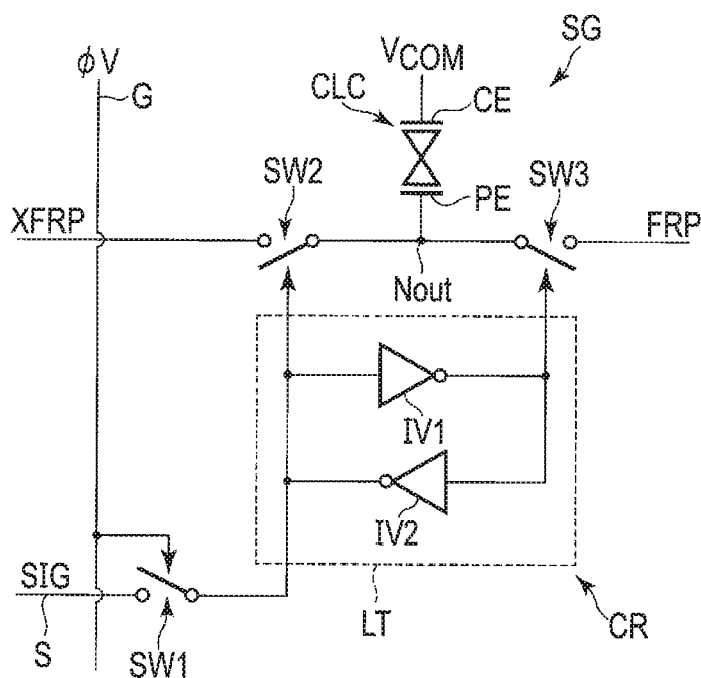
F I G. 6
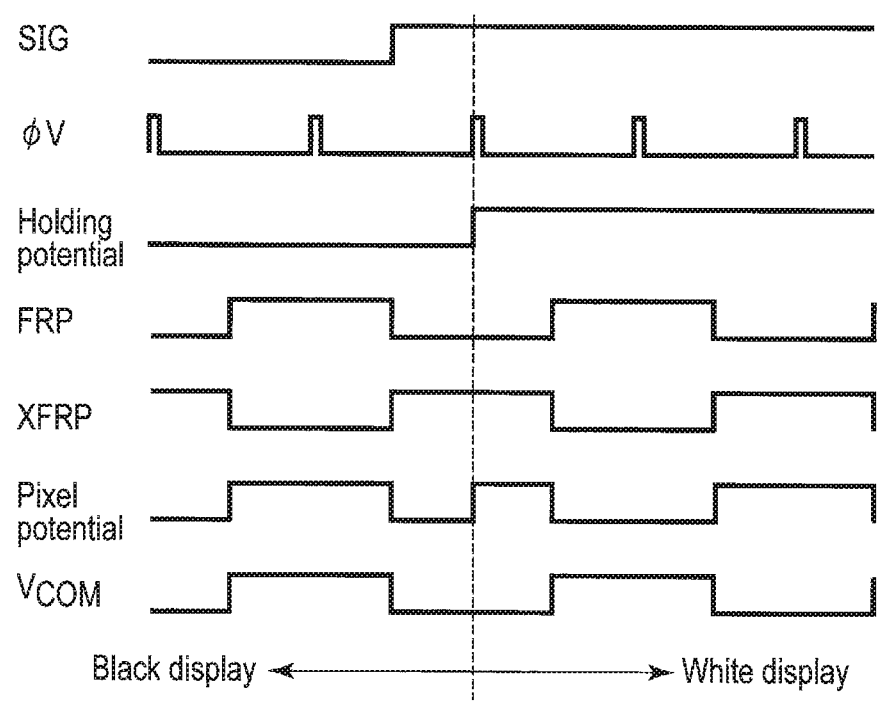
F I G. 7

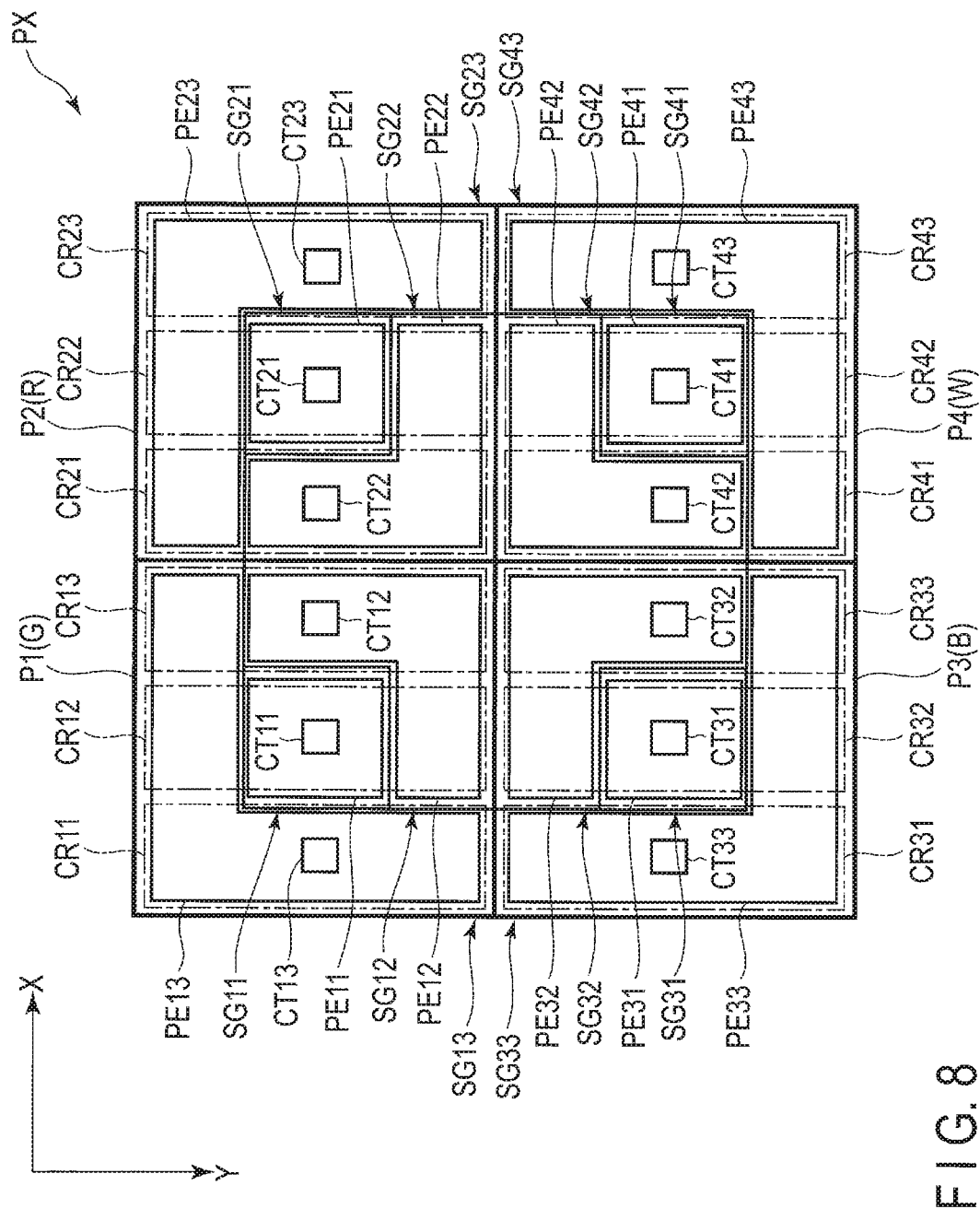
F I G. 8

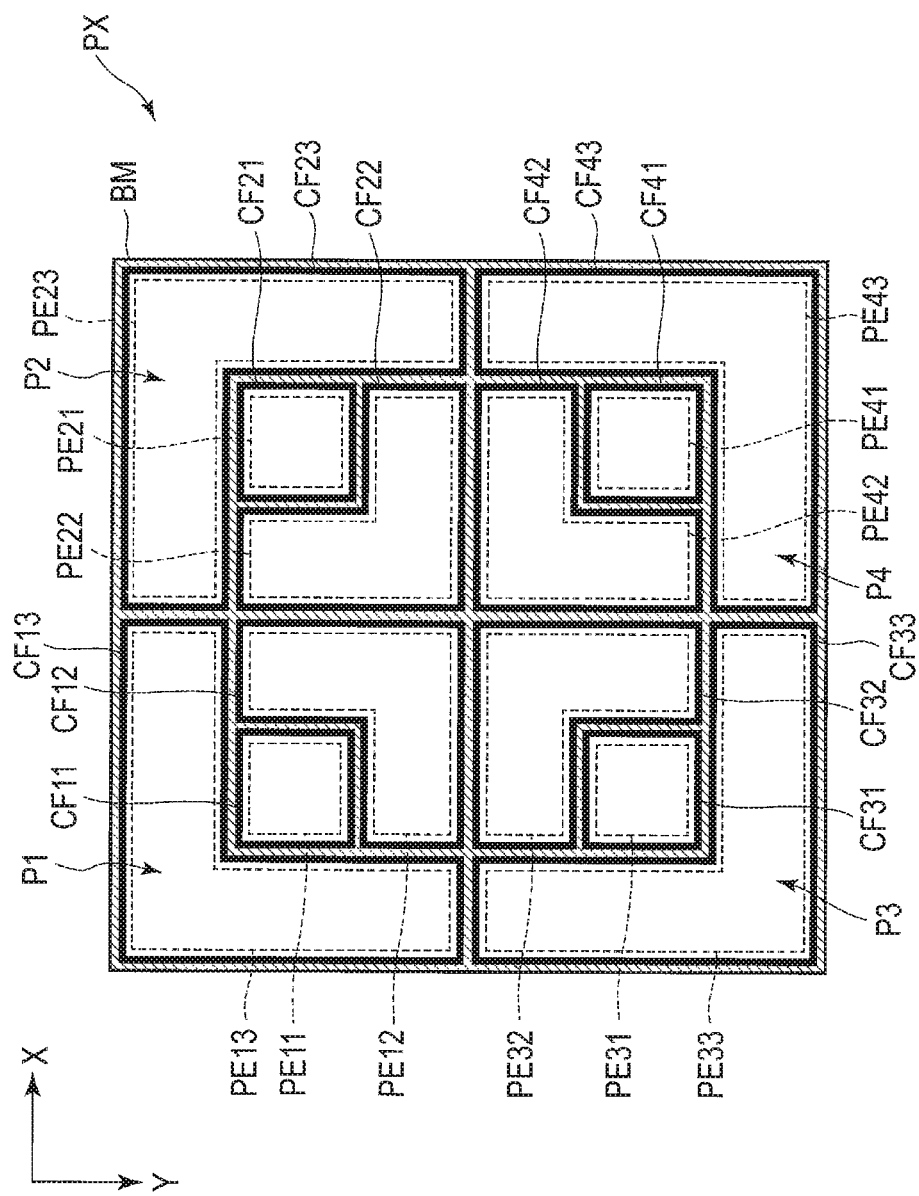
F I G. 9

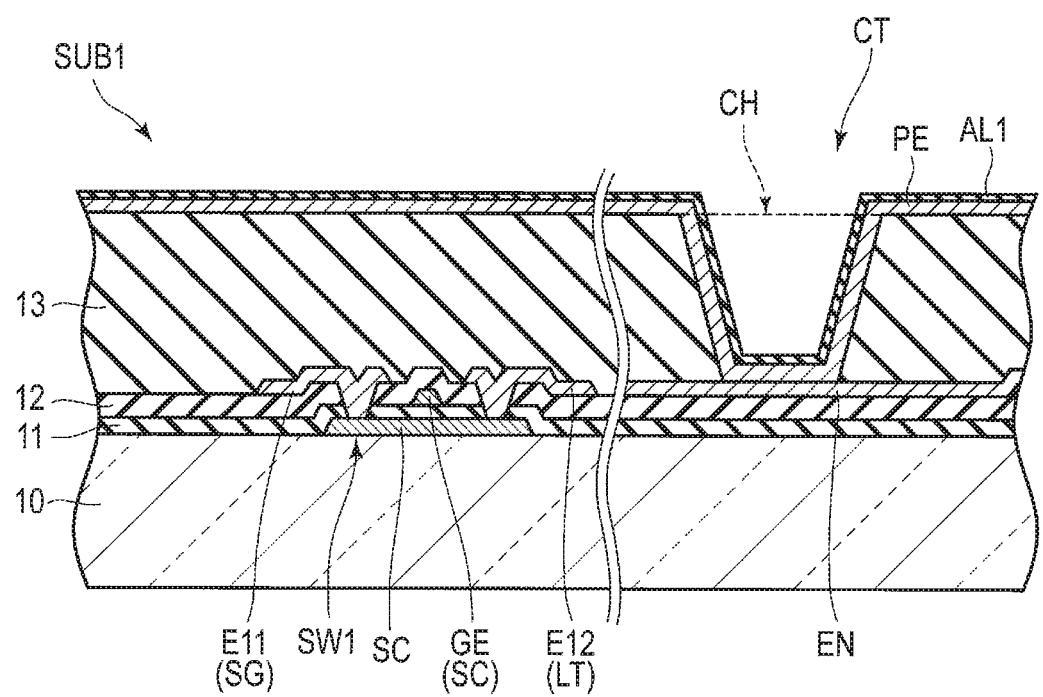
F I G. 10

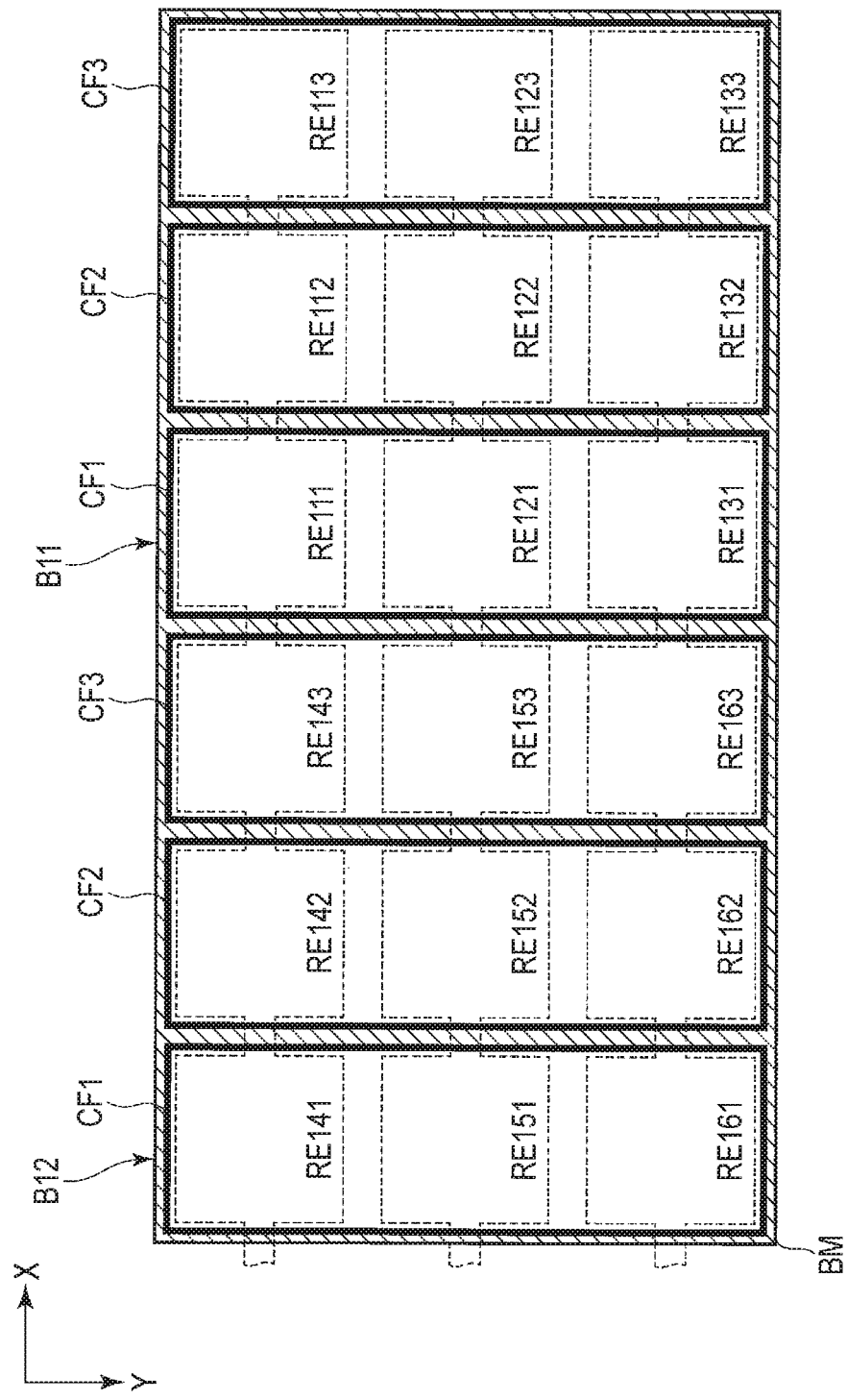
F I G. 18

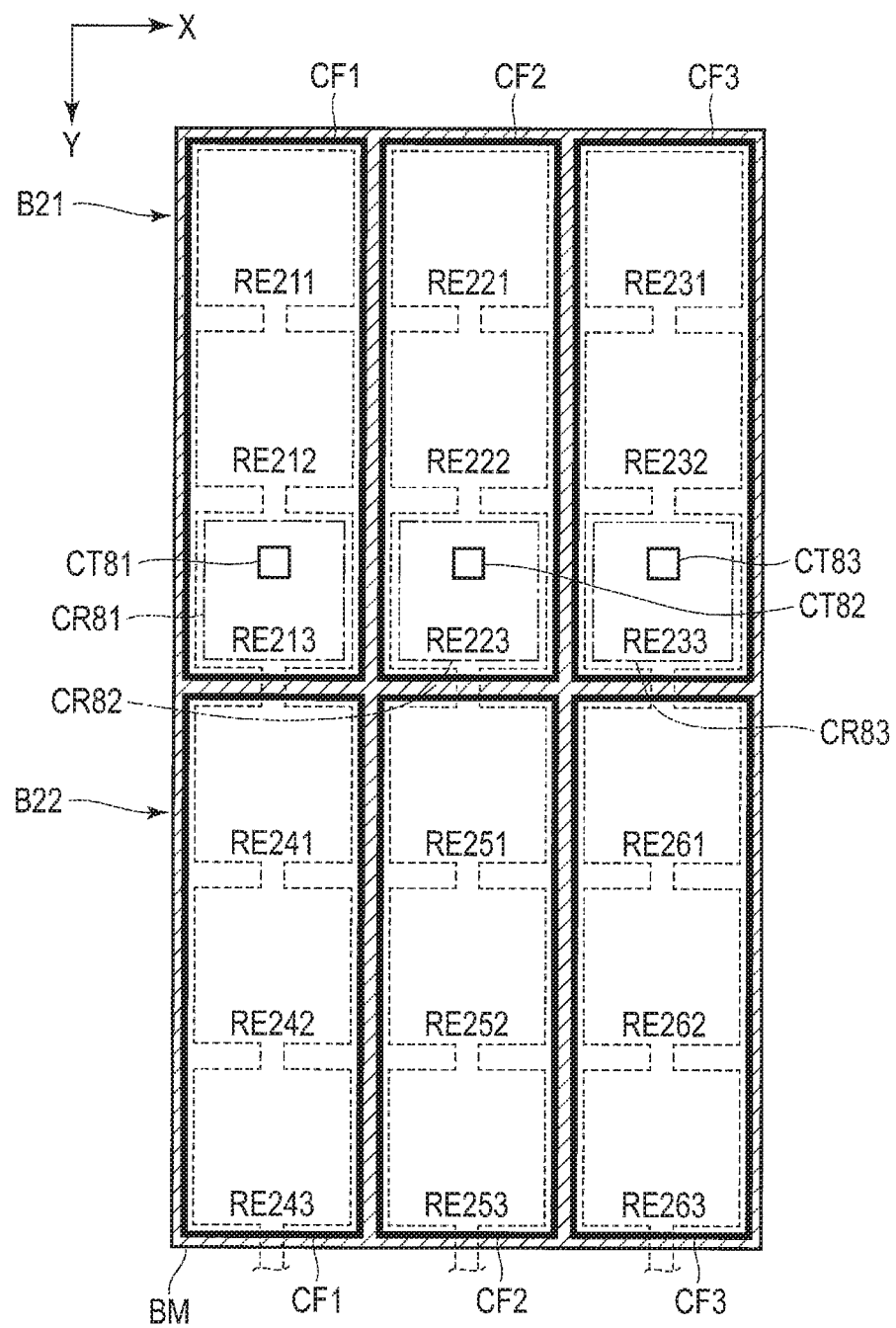
F I G. 19

DISPLAY DEVICE

CROSS-REFERENCE TO RELATED APPLICATIONS

This application is based upon and claims the benefit of priority from Japanese Patent Application No. 2016-033989, filed Feb. 25, 2016, the entire contents of which are incorporated herein by reference.

FIELD

Embodiments described herein relate generally to a display device.

BACKGROUND

In a display device for use in signage, for the purpose of display scale-up, a multi-display system in which a plurality of display devices are arranged like tiles for display is known. In such a multi-display system, a display image becomes discontinuous at a frame-shaped non-display portion (i.e., a frame) which exists between the display devices. Thus, improvement of the display quality is required. Because of the above requirement, there is a demand for achieving narrower frame structure in each of the display devices.

BRIEF DESCRIPTION OF THE DRAWINGS

FIG. 6 is an illustration showing a configuration example of a segment SG.

FIG. 7 is an illustration showing a timing chart for describing the operation of the segment SG shown in FIG. 6.

FIG. 8 is a plan view showing a configuration example of a main pixel PX.

FIG. 9 is a plan view for describing a positional relationship between a pixel electrode and a color filter in the main pixel PX shown in FIG. 8.

FIG. 10 is an illustration showing a cross-section of a first substrate SUB1 shown in FIG. 3.

FIG. 18 is a plan view for describing a positional relationship between a reflective electrode and a color filter in pixel blocks B11 and B12 shown in FIG. 17.

FIG. 19 is a plan view for describing a positional relationship between a reflective electrode and a color filter in pixel blocks B21 and B22 shown in FIG. 2.

DETAILED DESCRIPTION

Figure 1:
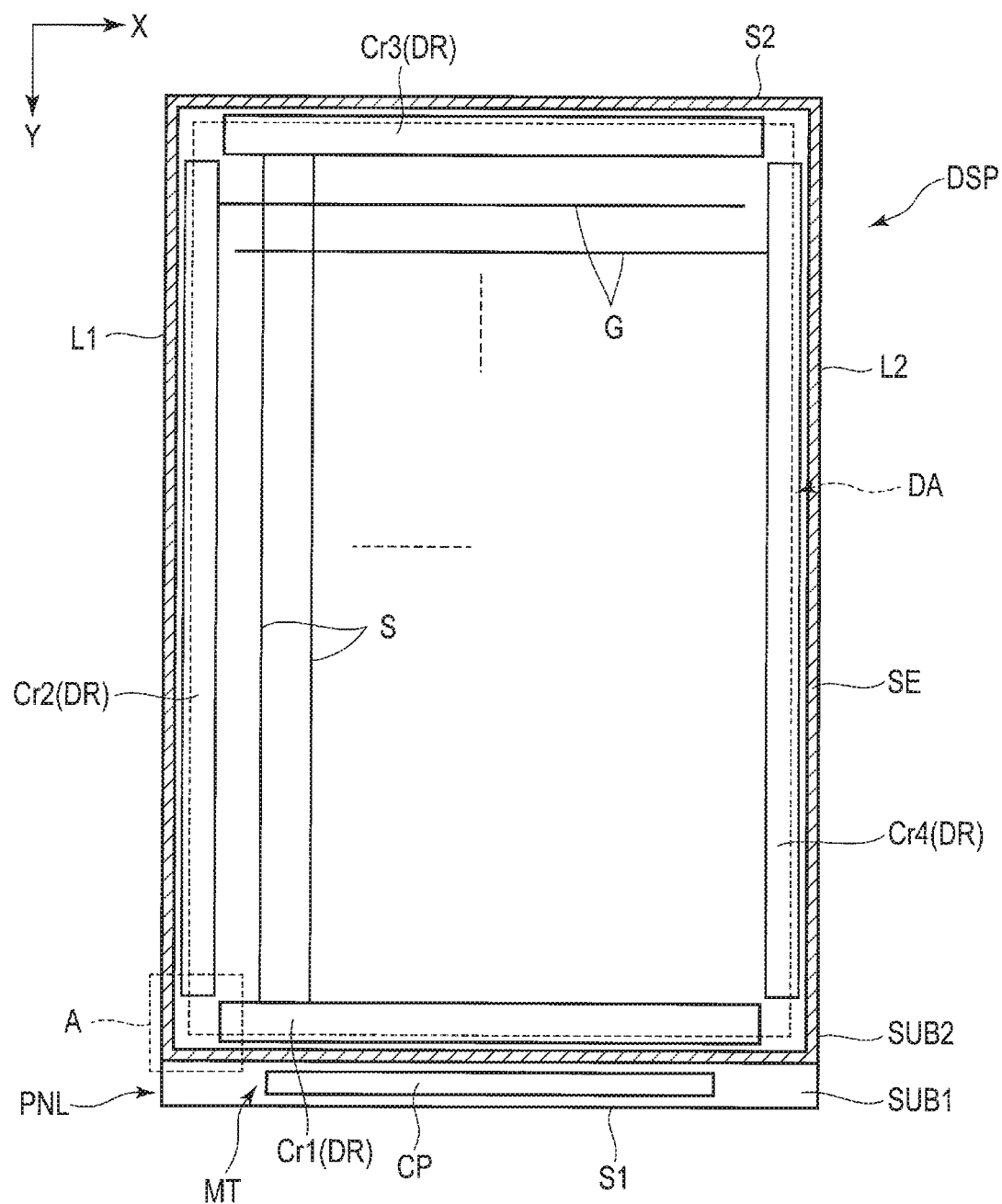
FIG. 1 is a plan view showing a configuration example of a display device DSP.

In general, according to one embodiment, a display device includes: a main pixel comprising a plurality of sub-pixels which exhibit different colors, respectively; a first pixel block adjacent to the main pixel; a second pixel block adjacent to the first pixel block, and electrically connected to the first pixel block; and a driver which drives the main pixel and the first pixel block, wherein the main pixel, the first pixel block, and the second pixel block are located in a display area which displays an image, the display area includes an outer edge portion, the first pixel block is closer to the outer edge portion than the main pixel is, and the second pixel block is closer to the outer edge portion than the first pixel block is, and the second pixel block overlaps the driver in planar view.

Embodiments will be described hereinafter with reference to the accompanying drawings. The disclosure is merely an example, and proper changes within the spirit of the invention, which are easily conceivable by a skilled person, are included in the scope of the invention as a matter of course. In addition, in some cases, in order to make the description clearer, the widths, thicknesses, shapes, etc., of the respective parts are schematically illustrated in the drawings, compared to the actual modes. However, the schematic illustration is merely an example, and adds no restrictions to the interpretation of the invention. In the drawings, reference numbers of continuously arranged elements equivalent or similar to each other may be omitted in some cases. Besides, in the specification and drawings, the structural elements, which have functions identical or similar to the functions described in connection with preceding drawings, are denoted by the same reference numbers, and a duplicated detailed description thereof may be arbitrarily omitted.

Embodiment 1

FIG. 1 is a plan view showing a configuration example of a display device DSP. In the drawing, a first direction X and a second direction Y intersect each other, and in one example, they are orthogonal to each other. Further, viewing the display device DSP from a normal direction orthogonal to an X-Y plane which is defined by the first direction X and the second direction Y is referred to as a planar view.

The display device DSP includes a display panel PNL, a driver DR, etc. In one example, the display panel PNL is formed in a rectangular shape having a pair of short sides S1 and S2 along the first direction X, and a pair of long sides L1 and L2 along the second direction Y. However, the shape is not limited to the example illustrated, and the display panel PNL may have the other shape such as a polygonal, circular, or elliptical shape.

The display panel PNL includes a first substrate SUB1 and a second substrate SUB2. The first substrate SUB1 and the second substrate SUB2 are bonded to each other by a seal SE. The seal SE is arranged along each of the short sides S1 and S2, and the long sides L1 and L2. The display panel PNL includes a display area DA in which an image is displayed at the inner side with respect to the seal SE. The display area DA includes a main pixel, and a pixel block which functions as a display pixel in a pseudo manner, which will be described in detail later. The first substrate SUB1 includes a signal line S, a scanning line G, and a conductive line, a power line, etc., not shown, for supplying various voltages, in the display area DA. Signal lines S are arranged in the first direction X. Scanning lines G are arranged in the second direction Y.

The driver DR has the function of driving the main pixel and the pixel block. The driver DR includes peripheral circuits Cr1 to Cr4 located at the inner side surrounded by the seal SE. The peripheral circuits Cr1 to Cr4 are arranged on the first substrate SUB1, and are located on a peripheral portion within the display area DA. In one example, the peripheral circuit Cr1 is arranged along the short side S1, and comprises a signal line drive circuit and the like. The peripheral circuit Cr2 is arranged along the long side L1, and comprises a scanning line drive circuit, a polarity inversion circuit, a common drive circuit, and the like. The peripheral circuit Cr3 is arranged along the short side S2, and comprises a protection circuit and the like. The peripheral circuit Cr4 is arranged along the long side L2, and comprises a scanning line drive circuit, a polarity inversion circuit, a common drive circuit, and the like. The signal lines S are electrically connected to the peripheral circuits Cr1 and Cr3. The scanning lines G are electrically connected to the peripheral circuit Cr2 or Cr4. Note that the driver DR may further include a drive timing generation circuit and a power supply circuit, for example.

In the example illustrated, the display panel PNL comprises a driving IC chip CP. The driving IC chip CP is mounted on a mounting portion MT of the first substrate SUB1 along the short side S1. The driving IC chip CP includes parts of various circuits which constitute the driver DR.

Figure 2:
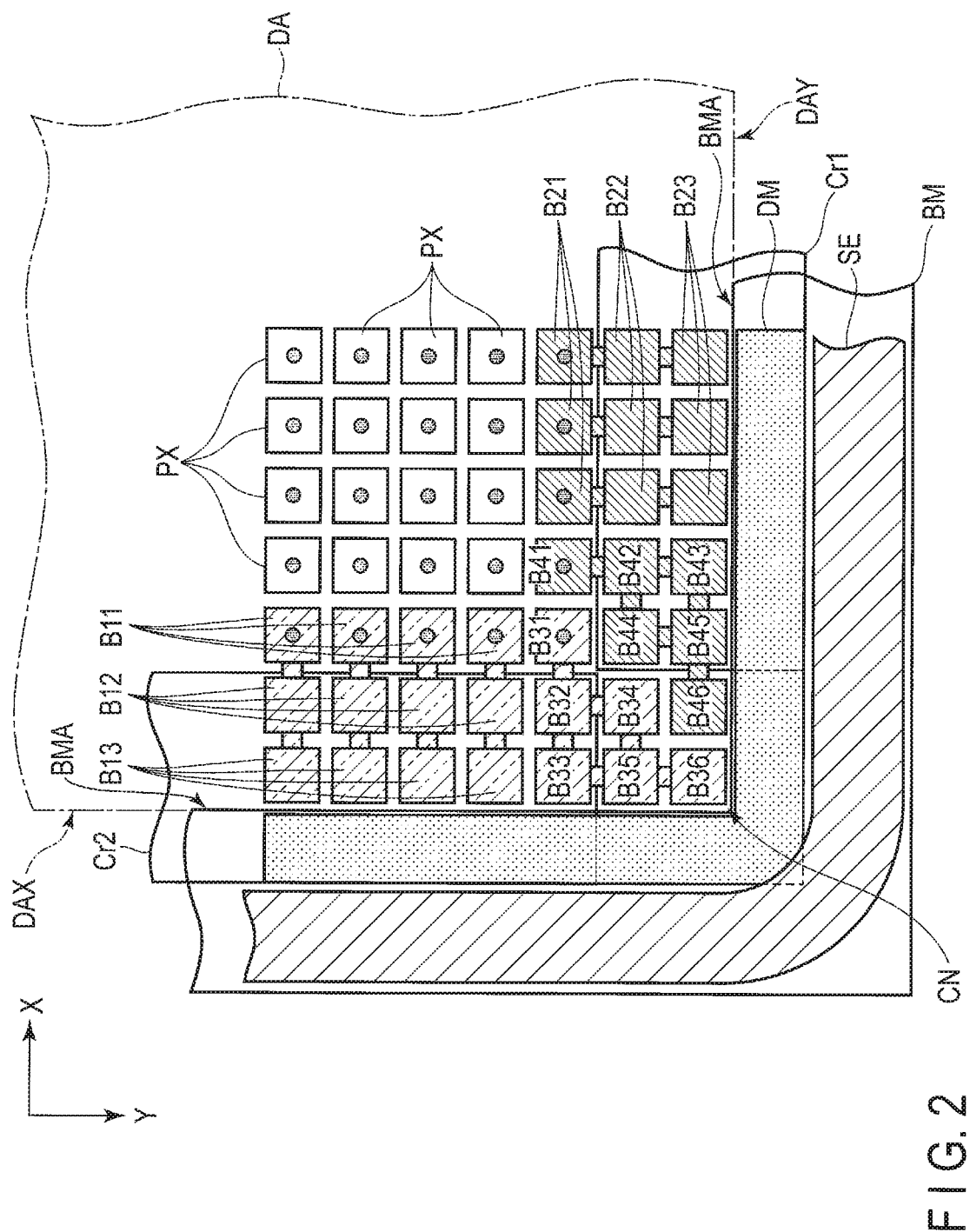
FIG. 2 is an enlarged plan view showing a configuration example of area A in the display device DSP shown in FIG. 1.

FIG. 2 is an enlarged plan view showing a configuration example of area A in the display device DSP shown in FIG. 1.

In the display area DA, main pixels PX and pixel blocks B are arranged. In the drawing, each of the main pixels PX and the pixel blocks B is shown in a square shape. The main pixels PX and a part of the pixel blocks B in which a circle is illustrated in the square outline include pixel circuits which are driven by the driver DR. Since pixel blocks B not having a circle in their respective square outlines do not include a pixel circuit, they are electrically connected to the pixel blocks B including the pixel circuits.

The main pixels PX are indicated as white squares in the drawing, and are arranged in a matrix in the first direction X and the second direction Y.

The pixel blocks B include, for example, pixel blocks B11 to B13, pixel blocks B21 to B23, pixel blocks B31 to B36, and pixel blocks B41 to B46.

The pixel blocks B11 to B13 are represented as squares with oblique lines sloped downward to the right in the drawing, are arranged in the first direction X, and are electrically connected to each other. The pixel block B11 corresponds to a pixel block comprising pixel circuits (hereinafter may be simply referred to as a first pixel block), and is adjacent to the main pixel PX. The pixel blocks B12 and B13 are located on the side closer to the seal SE (or an outer edge portion of the display area DA) than the pixel block B11 is. The pixel blocks B12 and B13 both correspond to pixel blocks not including pixel circuits (hereinafter may be referred to as a second pixel block and a third pixel block in order to distinguish them from the first pixel block). The pixel block B12 is adjacent to the pixel block B11, and the pixel block B12 and the pixel block B11 are connected to each other. The pixel block B13 is adjacent to the pixel block B12, and the pixel block B13 and the pixel block B12 are connected to each other. In the example illustrated, the pixel block B11 is closer to an outer edge portion DAX of the display area DA than the main pixel PX is, the pixel block B12 is closer to the outer edge portion DAX than the pixel block B11 is, and the pixel block B13 is closer to the outer edge portion DAX than the pixel block B12 is. Note that each of the outer edge portions DAX and DAY corresponds to an inner peripheral portion BMA which faces the display area DA of the seal SE.

The pixel blocks B21 to B23 are represented as squares with oblique lines sloped upward to the right in the drawing, are arranged in the second direction Y, and are electrically connected to each other. The pixel block B21 corresponds to the first pixel block, and is adjacent to the main pixel PX. The pixel blocks B22 and B23 are located on the side closer to the seal SE than the pixel block B21 is. The pixel blocks B22 and B23 correspond to the second pixel block and the third pixel block, respectively. The pixel block B22 is adjacent to the pixel block B21, and the pixel block B22 and the pixel block B21 are connected to each other. Further, the pixel block B23 is adjacent to the pixel block B22, and the pixel block B23 and the pixel block B22 are connected to each other. In the example illustrated, the pixel block B21 is closer to the outer edge portion DAY of the display area DA than the main pixel PX, the pixel block B22 is closer to the outer edge portion DAY than the pixel block B21, and the pixel block B23 is closer to the outer edge portion DAY than the pixel block B22.

In a corner portion CN of the display area DA, the pixel blocks B31 to B36 are electrically connected to each other. The pixel block B31 corresponds to the first pixel block including the pixel circuits, and the pixel blocks B32 to B36 all correspond to the pixel blocks not including the pixel circuits. For example, the pixel block B32 corresponds to the second pixel block, and the pixel block B33 or B34 corresponds to the third pixel block. The pixel blocks B31 to B33 are arranged in the first direction X, and are electrically connected to each other. The pixel blocks B32 and B34 are adjacent to each other in the second direction Y, and are electrically connected to each other. The pixel blocks B33 and B35 are adjacent to each other in the second direction Y, and the pixel block B35 is electrically connected to each of the pixel blocks B33 and B34. The pixel blocks B35 and B36 are adjacent to each other in the second direction Y, and are electrically connected to each other.

The pixel blocks B41 to B46 are electrically connected to each other. The pixel block B41 corresponds to the first pixel block including the pixel circuits, and the pixel blocks B42 to B46 all correspond to the pixel blocks not including the pixel circuits. For example, the pixel block 42 corresponds to the second pixel block, and the pixel block B43 or B44 corresponds to the third pixel block. The pixel blocks B41 to B43 are arranged in the second direction Y, and are electrically connected to each other. The pixel blocks B42 and B44 are adjacent to each other in the first direction X, and are electrically connected to each other. The pixel blocks B44 and B45 are adjacent to each other in the second direction Y, and the pixel block B45 is electrically connected to each of the pixel blocks B43 and B44. The pixel blocks B45 and B46 are adjacent to each other in the first direction X, and are electrically connected to each other.

Parts of the peripheral circuits Cr1 and Cr2 are located in the display area DA. The pixel blocks B12 and B13 overlap the peripheral circuit Cr2 in planar view. Also, the pixel blocks B22 and B23 overlap the peripheral circuit Cr1 in planar view. In the corner portion CN, in the example illustrated, the pixel blocks B32 and B33 overlap the peripheral circuit Cr2, and the pixel blocks B42 to B45 overlap the peripheral circuit Cr1.

In the example illustrated, a dummy electrode DM is arranged between the display area DA and the seal SE. The dummy electrode DM is arranged on the first substrate SUB1 shown in FIG. 1, and is electrically connected to a power line of a constant potential which is not illustrated. Here, the power line is, for example, a power line of a common potential connected to the common drive circuit. In the example illustrated, the dummy electrode DM overlaps the peripheral circuits Cr1 and Cr2 in planar view. Also, the dummy electrode DM is located between the seal SE and the outer edge portion DAX or DAY. While such a dummy electrode DM is arranged in order to capture ionic impurities, for example, it may be omitted.

A light-shielding layer BM is arranged on the second substrate SUB2 shown in FIG. 1, and overlaps the seal SE and the dummy electrode DM. However, the light-shielding layer BM does not overlap any of the pixel blocks B.

Next, a configuration example of the display panel PNL which constitutes the display device DSP of the present embodiment will be described. In the present embodiment, as an example of the display device DSP, a reflective liquid crystal display device will be described. The reflective liquid crystal display device displays an image by selectively reflecting light which enters from a display surface side, such as external light and auxiliary light.

Figure 3:
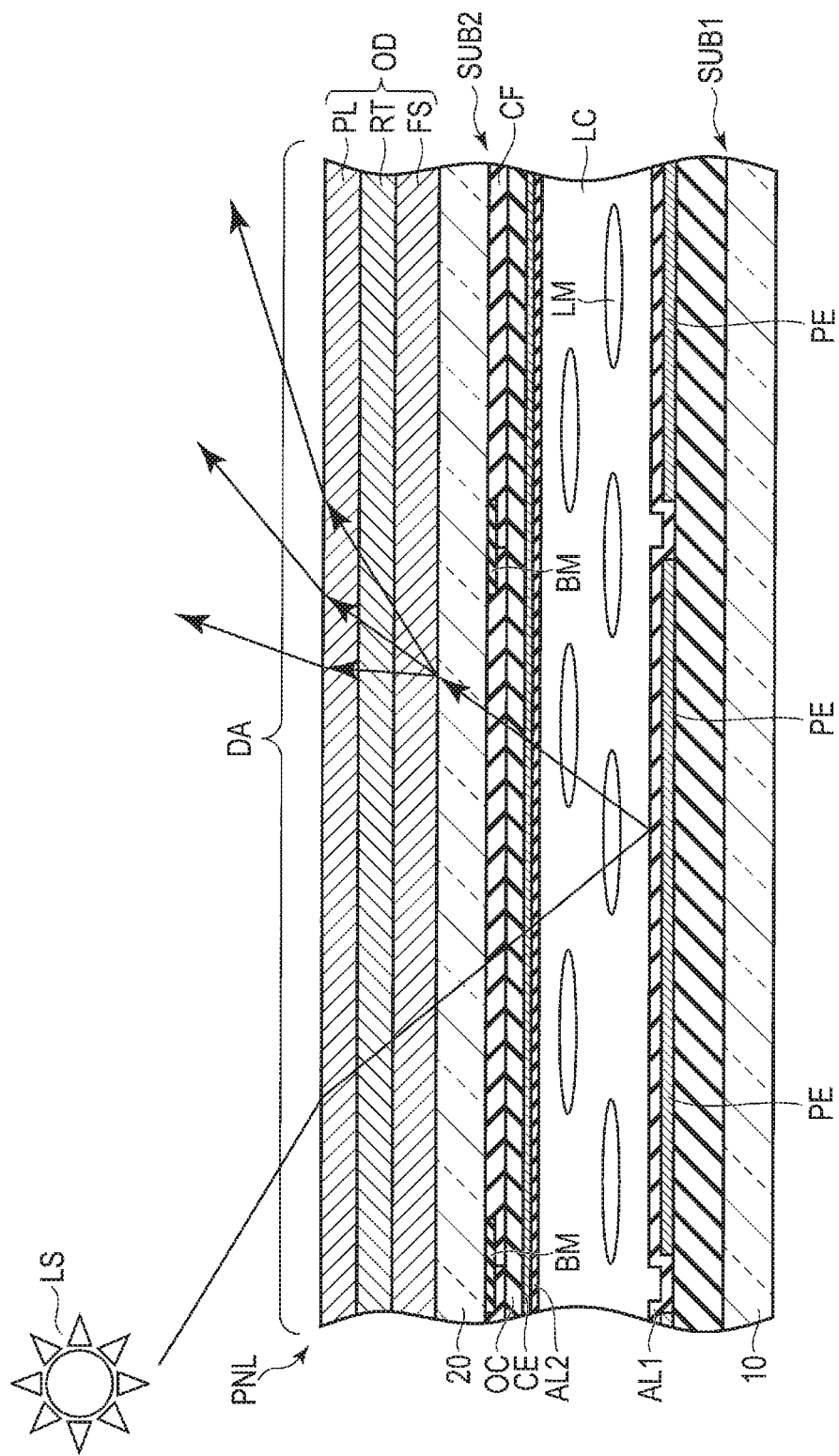
FIG. 3 is an illustration showing a cross-section of a display panel PNL.

FIG. 3 is an illustration showing a cross-section of the display panel PNL. Here, in the cross-section of the display panel PNL in the display area DA, only the structures necessary for explanation are illustrated. The display panel PNL includes the first substrate SUB1, the second substrate SUB2, a liquid crystal layer LC, and an optical element OD.

The first substrate SUB1 includes a first insulating substrate 10, a pixel electrode PE, a first alignment film AL1, etc. The pixel electrode PE is located on the first insulating substrate 10 at the side opposed to the second substrate SUB2. The pixel electrode PE corresponds to a reflective electrode and includes a reflective layer formed of a light reflective metal material such as aluminum or silver. A structure in which a transparent conductive layer, in addition to the reflective layer, is stacked is applicable to the pixel electrode PE. The transparent conductive layer is formed of a transparent conductive material such as indium tin oxide (ITO) or indium zinc oxide (IZO). In the following, the pixel electrode may be referred to as the reflective electrode. The first alignment film AL1 covers the pixel electrode PE.

Although not illustrated, the first substrate SUB1 includes various circuits such as the above-described peripheral circuits and pixel circuits, in addition to various conductive lines such as the scanning lines and the signal lines, between the first insulating substrate 10 and the pixel electrode PE. That is, the pixel electrode PE is located on various conductive lines and circuits.

The second substrate SUB2 includes a second insulating substrate 20, the light-shielding layer BM, a color filter layer CF, an overcoat layer OC, a common electrode CE, a second alignment film AL2, etc. The light-shielding layer BM is located on the second insulating substrate 20 at the side opposed to the first substrate SUB1. The light-shielding layer BM is opposed to a gap between adjacent pixel electrodes PE in the display area DA illustrated. Also, the light-shielding layer BM is disposed outside the display area DA as shown in FIG. 2. The color filter layers CF are located on the second insulating substrate 20 at the side opposed to the first substrate SUB1, and parts of the color filter layers CF overlap the light-shielding layer BM. The color filter layers CF include a red color filter, a green color filter, a blue color filter, and the like. The red color filter is arranged in a region including a sub-pixel which exhibits red. The green color filter is arranged in a region including a sub-pixel which exhibits green. The blue color filter is arranged in a region including a sub-pixel which exhibits blue. Note that the color filter layers CF may include a color filter of another color, and in one example, the color filter layers CF may include a white color filter arranged in a sub-pixel which exhibits white, or include a transparent layer. The overcoat layer OC covers the color filter layers CF. The common electrode CE is located on the overcoat layer OC at the side opposed to the first substrate SUB1. The common electrode CE is opposed to a plurality of pixel electrodes PE. The common electrode CE is formed of a transparent conductive material such as ITO or IZO. The second alignment film AL2 covers the common electrode CE.

Further, in the second substrate SUB2, since the transmissivity can be reduced by stacking color filters of different colors at a boundary between the sub-pixels exhibiting different colors, the light-shielding layer BM may be omitted. In the display panel PNL of the monochrome display type, the color filter layers CF are omitted.

The liquid crystal layer LC is held between the first substrate SUB1 and the second substrate SUB2, and includes liquid crystal molecules LM disposed between the first alignment film AL1 and the second alignment film AL2.

The optical element OD is disposed on a side opposite to a surface of the second substrate SUB2, which is in contact with the liquid crystal layer LC. The optical element OD includes, for example, a scattering layer FS, a retardation film RT, and a polarizer PL. The scattering layer FS is adhered to the second insulating substrate 20, the retardation film RT is stacked on the scattering layer FS, and the polarizer PL is stacked on the retardation film RT. Note that the structure of the optical element OD is not limited to the example illustrated.

The scattering layer FS is an anisotropic scattering layer which scatters incident light from a particular direction. In the example illustrated, the scattering layer FS has the function of mostly passing the incident light from a light source LS in the figure without scattering it, and scattering light from a particular direction, that is, the light reflected by the pixel electrodes PE. It is desirable to stack a plurality of scattering layers FS in order to extend the range of scattering, prevent iridescent color, and the like. The retardation film RT functions as a quarter-wave plate. In one example, the retardation film RT is a stacked layer body constituted by a quarter-wave plate and a half-wave plate. Therefore, a wavelength dependency can be reduced, and a desired phase difference within a wavelength range used for color display can be obtained.

In such a display panel PNL, the side close to the light source LS corresponds to a display surface side. In the example illustrated, the surface of the optical element OD corresponds to a display surface, and if a cover member is disposed on the surface of the optical element OD, the surface of the cover member corresponds to the display surface.

Both the main pixel PX and the pixel block B shown in FIG. 2 include the pixel electrode PE and the color filter layer CF described above. For example, when the pixel block B12 shown in FIG. 2 comprises the pixel electrode PE shown in the drawing, the peripheral circuit Cr2 is located between the first insulating substrate 10 and the pixel electrode PE. Although the pixel electrode at a position which overlaps the peripheral circuit is not directly connected to the pixel circuits, such the pixel electrode is connected to another pixel electrode connected to the pixel circuits at a position not overlapping the peripheral circuit. Accordingly, even if the pixel electrode is at a position which overlaps the peripheral circuits, that pixel electrode can be driven via an adjacent pixel electrode.

As can be seen, since the pixel electrode, which is the reflective electrode, is arranged at a position which overlaps the peripheral circuit, also in an area which overlaps the peripheral circuit, light which enters from the display surface side can be selectively reflected, which contributes to display. Accordingly, the display area DA can be broadened not only to an area which does not overlap the peripheral circuit, but also to an area overlapping the peripheral circuit which is closer to the seal SE. Thereby, narrowing of the frame of the display device DSP is enabled.

Figure 4:
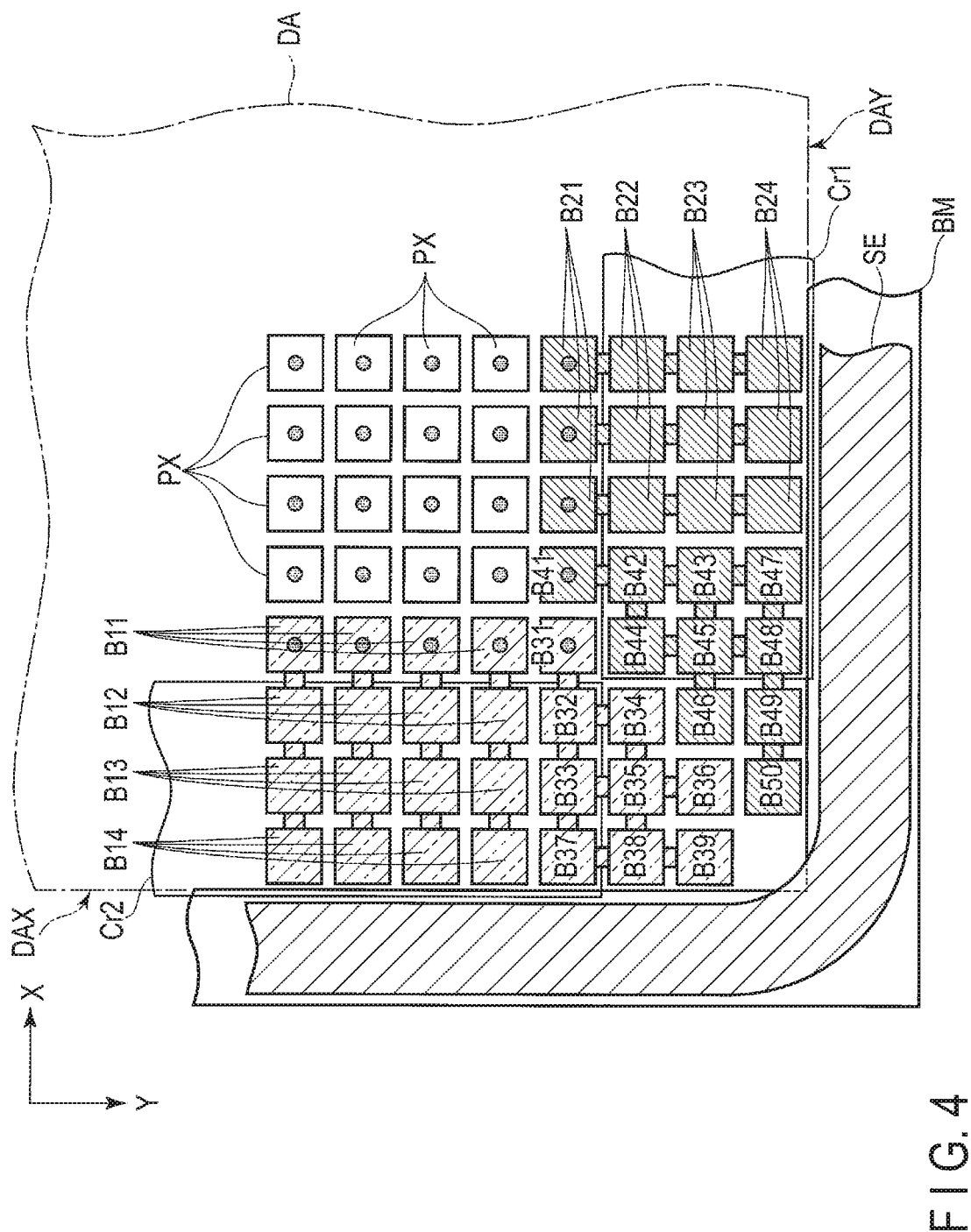
FIG. 4 is an enlarged plan view showing another configuration example of area A in the display device DSP shown in FIG. 1.

FIG. 4 is an enlarged plan view showing another configuration example of area A in the display device DSP shown in FIG. 1.

The configuration example shown in FIG. 4 is different from the configuration example illustrated in FIG. 2 in that a dummy electrode is not provided. Pixel blocks B11 to B14 arranged in the first direction X are electrically connected to each other. Pixel blocks B21 to B24 arranged in the second direction Y are electrically connected to each other. The pixel blocks B14 and B24 are both arranged at positions adjacent to the seal SE.

Pixel blocks B31 to B39 are electrically connected to each other. Note that the relationship of connection regarding the pixel blocks B31 to B36 is as described referring to FIG. 2. The pixel blocks B33 and B37 are adjacent to each other in the first direction X, and are electrically connected to each other. The pixel blocks B35 and B38 are adjacent to each other in the first direction X, and the pixel block B38 is electrically connected to each of the pixel blocks B35 and B37. The pixel blocks B38 and B39 are adjacent to each other in the second direction Y, and are electrically connected to each other. The pixel blocks B37 to B39 are all arranged at positions adjacent to the seal SE.

Pixel blocks B41 to B50 are electrically connected to each other. Note that the relationship of connection regarding the pixel blocks B41 to B46 is as described referring to FIG. 2. The pixel blocks B43 and B47 are adjacent to each other in the second direction Y, and are electrically connected to each other. The pixel blocks B45 and B48 are adjacent to each other in the second direction Y, and the pixel block B48 is electrically connected to each of the pixel blocks B45 and B47. The pixel blocks B48, B49, and B50 are arranged in the first direction X, and are electrically connected to each other. The pixel blocks B47 to B50 are all arranged at positions adjacent to the seal SE.

The pixel blocks B12 to B14, B32, B33, and B37 overlap the peripheral circuit Cr2 in planar view. The pixel blocks B22 to B24, B42 to B45, B47, and B48 overlap the peripheral circuit Cr1 in planar view. The light-shielding layer BM overlaps the seal SE, but does not overlap any of the pixel blocks B11 to B14, B21 to B24, B31 to B39, and B41 to B50. The width of the light-shielding layer BM is greater than or equal to the width of the seal SE, and in the example illustrated, the light-shielding layer BM is wider than the seal SE. However, the width of the light-shielding layer BM in the illustrated configuration example is less than that of the configuration example illustrated in FIG. 2. That is, the outer edge portions DAX and DAY of this configuration example are closer to the seal SE as compared to the configuration example illustrated in FIG. 2. Among the pixel blocks located in the display area DA, pixel blocks located at the outermost end, i.e., the pixel blocks B37 to B39, and B47 to B50, are closer to the seal SE as compared to those in the configuration example illustrated in FIG. 2. An interval between these outermost pixel blocks and the seal SE is less than a width of one pixel block.

According to such a configuration example, the display area DA can further be broadened to an area even more close to the seal SE.

Figure 5:
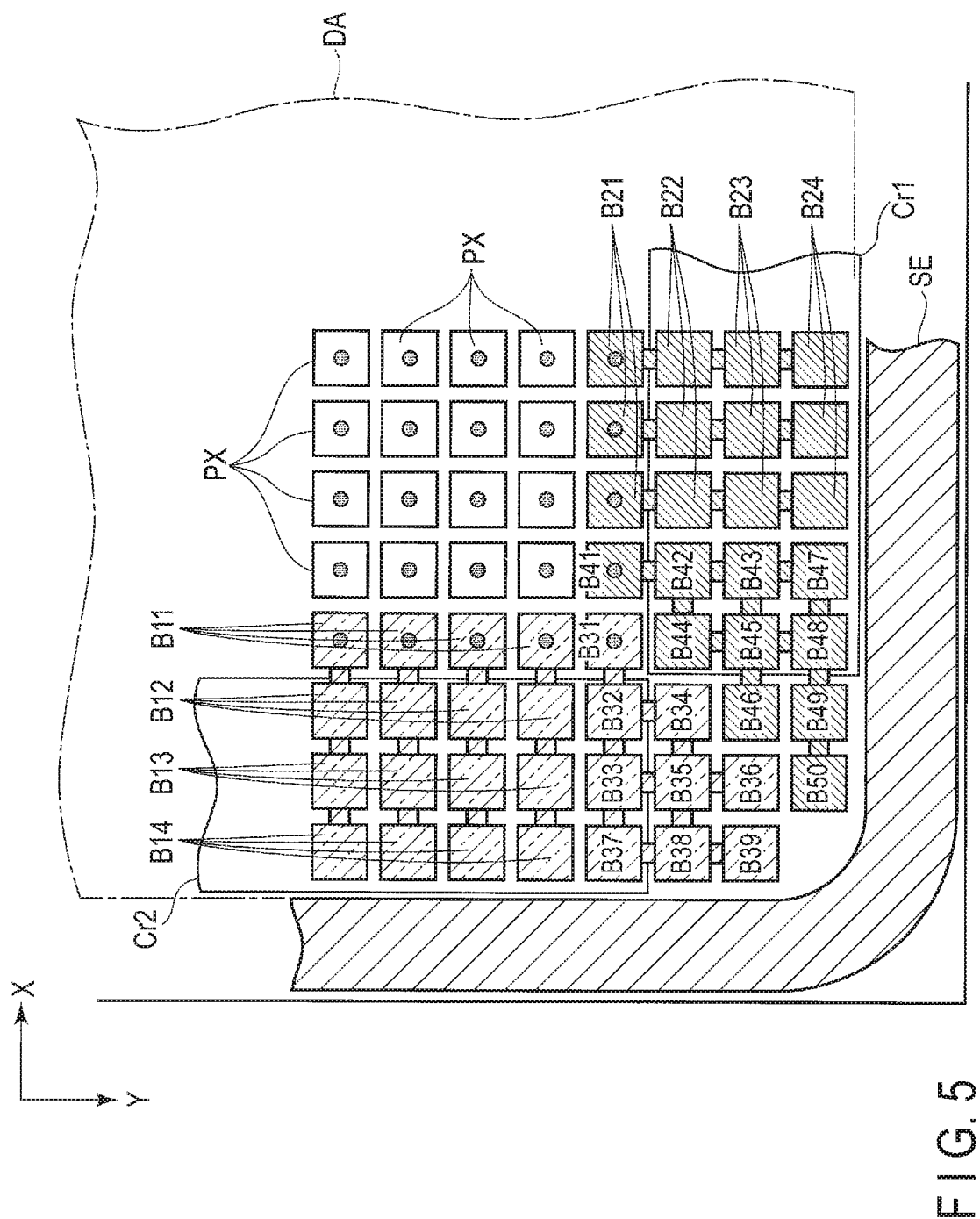
FIG. 5 is an enlarged plan view showing yet another configuration example of area A in the display device DSP shown in FIG. 1.

FIG. 5 is an enlarged plan view showing yet another configuration example of area A in the display device DSP shown in FIG. 1.

The configuration example shown in FIG. 5 is different from the configuration example illustrated in FIG. 4 in that a light-shielding layer is not provided. The positional relationship between the pixel block and the peripheral circuit is similar to that of the configuration example shown in FIG. 4.

According to this configuration example, the display area DA can be broadened similarly to the configuration example shown in FIG. 4.

Next, a configuration example of a segment SG which constitutes the above-described main pixel PX and pixel block B will be described referring to FIG. 6. It is assumed that the pixel block B in this explanation corresponds to the first pixel block comprising the pixel circuits among the pixel blocks described above. The segment SG corresponds to the smallest unit which is independently driven in each of the main pixel PX and the first pixel block B. For example, the main pixel PX comprises sub-pixels which exhibit red, green, and blue, respectively, and each of the sub-pixels is constituted of a plurality of segments SG whose areas are different. The first pixel block B is similarly constituted of a plurality of segments SG whose areas are different.

The segment SG includes a liquid crystal capacitance CLC and a pixel circuit CR. The liquid crystal capacitance CLC is a capacitance component of the liquid crystal layer produced between the pixel electrode PE and the common electrode CE. The pixel electrode PE is electrically connected to the pixel circuit CR. The common electrode CE is opposed to the pixel electrode PE and is electrically connected to the common drive circuit not shown, and a common voltage Vcom is applied to the common electrode CE.

The pixel circuit CR includes three switch portions SW1 to SW3 and a latch portion LT. For example, the switch portion SW1 is a single n-channel MOS transistor. In the switch portion SW1, one end is electrically connected to the signal line S, and the other end is electrically connected to the latch portion LT. On/Off of the switch portion SW1 is controlled by a scanning signal supplied from the scanning line G. That is, the switch portion SW1 is turned on (closed) as a scanning signal φV is given from the scanning line drive circuit included in the peripheral circuit Cr2 or Cr4 shown in FIG. 1 through the scanning line G, and takes in data (signal potential corresponding to gradation) SIG supplied from the signal line drive circuit included in the peripheral circuit Cr1 or Cr3 shown in FIG. 1 through the signal line S.

The latch portion LT includes inverters IV1 and IV2 connected in parallel to be opposite to each other. For example, each of the inverters IV1 and IV2 is a CMOS inverter. The latch portion LT holds (latches) a potential corresponding to the data SIG taken in by the switch portion SW1. That s, the latch portion LT functions as a memory portion capable of holding data.

Although each of the switch portions SW2 and SW3 is, for example, a transfer switch in which an re-channel MOS transistor and a p-channel MOS transistor are connected in parallel, a transistor of the other structure can be used. To one end of the switch portion SW2, a voltage XFRP which is in opposite phase to the common voltage Vcom is applied. To one end of the switch portion SW3, a voltage FRP which is in phase with the common voltage Vcom is applied. The other ends of the switch portions SW2 and SW3 are connected to each other, and are also electrically connected to the pixel electrode PE to function as an output node Nout of the pixel circuit CR. Either the switch portion SW2 or the switch portion SW3 is turned on depending on the polarity of the holding potential of the latch portion LT. Thereby, the in-phase voltage FRP or the opposite-phase voltage XFRP is applied to the pixel electrode PE in the liquid crystal capacitance CLC in which the common voltage Vcom is applied to the common electrode CE.

FIG. 7 is an illustration showing a timing chart for describing the operation of the segment SG shown in FIG. 6. In the following, a case where a normally black mode is adopted, that is, black is displayed in a state in which a voltage is not applied to the liquid crystal layer LC, will be explained.

In the pixel circuit CR, the data SIG supplied to the signal line S is taken in at the timing when the scanning signal φV is given to the switch portion SW1, and a potential corresponding to the taken data SIG is held by the latch portion LT. When the data SIG corresponding to logic 0 is taken in, the holding potential of the latch portion LT becomes negative polarity. In this case, the switch portion SW2 is turned off (opened) and the switch portion SW3 is turned on (closed), and the voltage FRP which is in phase with the common voltage Vcom is applied to the pixel electrode PE. Thereby, a pixel potential of the pixel electrode PE becomes equal to the common voltage Vcom of the common electrode CE. Accordingly, no voltage is applied to the liquid crystal layer LC, and the segment SG displays black.

Meanwhile, in the pixel circuit CR, when the data SIG corresponding to logic 1 is taken in, the holding potential of the latch portion LT become positive polarity. In this case, the switch portion SW3 is turned off (opened) and the switch portion SW2 is turned on (closed), and the voltage XFRP which is in opposite phase to the common voltage Vcom is applied to the pixel electrode PE. Thereby, a potential difference between the pixel potential of the pixel electrode PE and the common voltage Vcom of the common electrode is created. That is, a voltage is applied to the liquid crystal layer LC. Thus, since light passing through the liquid crystal layer LC is modulated and part of the light contributes to display, the segment SG displays white.

In the above example, a case where a static random access memory (SRAM) is used as a memory portion incorporated in the segment SG has been described. However, the memory portion is not limited to this example, and the other structures such as a dynamic random access memory (DRAM) may be applied.

As described above, in the present embodiment, the segment SG includes a memory portion capable of holding data in the pixel circuit CR, and such a structure may be referred to as a memory-in-pixel (MIP) scheme. According to this structure, the memory portion can store binary data (logic 1/logic 0), and gradation expression can be implemented digitally based on the binary data. As a gradation expression method using such binary data, in the present embodiment, an area gradation method is applied. In the area gradation method, a single sub-pixel includes several segments SG, and the gradation display is realized by a combination of areas of the segments SG. The area gradation method is, for example, a gradation expression method of expressing $2^n$ gradation levels by N segments SG obtained by weighing the area proportion as $2^0, 2^1, 2^2, \ldots, 2^{n-1}$.

According to such an MIP scheme, since the gradation of a sub-pixel is expressed by using the data held in the memory portion, an operation of writing a signal potential on which the gradation is reflected for each pixel does not need to be executed in a frame period. Therefore, power consumption of the display device DSP can be reduced.

Also, there is a need for rewriting only a part of the main pixels PX in the display screen displayed in the display area DA. In this case, the signal potential of each of the segments SG which partially constitute the main pixel PX may be rewritten. That is, data is transferred to only the main pixel PX which needs to be rewritten, and there is no need to transfer data to the main pixel PX not needing a rewrite. Accordingly, since a data transfer amount can be reduced, there is also an advantage of being able to further reduce power of the display device DSP.

Also, in the structure to which the MIP scheme is applied, either the switch portion SW2 or SW3 is turned on depending on the polarity of the holding potential of the latch portion LT, and thus, either the in-phase voltage FRP or the reverse-phase voltage XFRP is applied to the pixel electrode PE. Thereby, since a fixed voltage is constantly applied to the segment SG, shading can be suppressed.

Next, a configuration example of the main pixel PX applicable in the present embodiment will be described.

FIG. 8 is a plan view showing a configuration example of the main pixel PX. The main pixel PX has the shape of a square in which the length in the first direction X and the length in the second direction Y are substantially the same. The main pixel PX comprises four sub-pixels P1 to P4. Areas of the sub-pixels P1 to P4 are substantially the same. In the example illustrated, each of the sub-pixels P1 to P4 has the shape of a square in which the length in the first direction X and the length in the second direction Y are substantially the same. The sub-pixel P1 and the sub-pixel P2 are arranged in the first direction X. The sub-pixel P3 and the sub-pixel P4 are arranged in the first direction X. Also, the sub-pixel P1 and the sub-pixel P3 are arranged in the second direction Y. The sub-pixel P2 and the sub-pixel P4 are arranged in the second direction Y. The sub-pixels P1 to P4 exhibit different colors. In one example, the sub-pixel P1 exhibits green (G), the sub-pixel P2 exhibits red (R), the sub-pixel P3 exhibits blue (B), and the sub-pixel P4 exhibits white (W). Note that the colors corresponding to the sub-pixels P1 to P4 shown in FIG. 8 are only an example, and different colors may be adopted for the corresponding sub-pixels. However, the blue (B) and white (W) sub-pixels should preferably be adjacent to each other. Further, the red (R) and green (G) sub-pixels should preferably be adjacent to each other.

In the main pixel PX, the sub-pixels P1 to P4 have similar structures. The structure of each of the sub-pixels will be described in detail below. Here, an explanation will be given by taking the sub-pixel P1 as an example, and detailed explanations of the other sub-pixels will be omitted.

That is, the sub-pixel P1 comprises three segments SG11 to SG13 for performing 3-bit gradation display. The segment SG11 corresponds to a rectangular region located at the central portion of the sub-pixel P1. The segment SG12 is located closer to the central side of the main pixel PX than the segment SG 11 is. The segment SG12 corresponds to an L-shaped region including a portion which is adjacent to the sub-pixel P2 and extends in the second direction Y, and a portion which is adjacent to the sub-pixel P3 and extends in the first direction X. The area of the segment SG12 is greater than the area of the segment S11. The segment SG13 is located closer to the peripheral edge of the main pixel PX than the segment SG 11 is. The segment SG 13 corresponds to an L-shaped region including portions extending in the first direction X and the second direction Y, respectively, along the segments SG11 and SG12. The area of the segment SG13 is greater than the area of the segment S12. The ratio of the areas of segment SG11, segment SG12, and segment SG13 is, for example, 1:2:4 ($=2^0:2^1:2^2$). Note that the combination of the ratio of the areas of the segments SG11 to SG13 is not limited to the above example. The segment SG11 is a display area corresponding to the least significant bit (for example, $2^0$) in the 3-bit area gradation. The segment SG13 is a display area corresponding to the most significant bit (for example, $2^2$) in the 3-bit area gradation. The segment SG12 is a display area corresponding to the intermediate bit (for example, $2^1$) in the 3-bit area gradation. By the combination of these segments SG11 to SG13, the 3-bit area gradation display is enabled.

Similarly, the sub-pixel P2 comprises segments SG21 to 23, the sub-pixel P3 comprises segments SG31 to 33, and the sub-pixel P4 comprises segments SG41 to 43.

Next, an example of the layout of the pixel circuit CR corresponding to each segment SG will be described. It is assumed that the pixel circuit CR is formed in an area represented by a one-dot chain line in the drawing. Although the specific structure thereof is not illustrated, the pixel circuit CR may be structured in any way as long as it can realize the equivalent circuit shown in FIG. 6. Also, the pixel circuits CR illustrated all have the same structure. In one example, although one pixel circuit CR is formed in an area defined by two adjacent signal lines S and two adjacent scanning lines G, the location is not limited to this example. That is, the area may be defined by the other lines such as conductive lines for supplying the voltage FRP or voltage XFRP.

In the example illustrated, pixel circuits CR11 to CR13 and pixel circuits CR21 to CR23 are arranged in the first direction X. The pixel circuits CR11 to CR13 are disposed to correspond to the sub-pixel P1, and the pixel circuits CR21 to CR23 are disposed to correspond to the sub-pixel P2. Pixel circuits CR31 to CR33 and pixel circuits CR41 to CR43 are arranged in the first direction X. The pixel circuits CR31 to CR33 are disposed to correspond to the sub-pixel P3, and the pixel circuits CR41 to CR43 are disposed to correspond to the sub-pixel P4.

Next, the relationship of connection between each pixel circuit CR and the pixel electrode PE will be described. The sub-pixel P1 comprises pixel electrodes PE11 to PE13 located in the segments SG11 to SG13, respectively. The pixel electrode PE11 has a rectangular shape corresponding to the shape of the segment SG11, and is electrically connected to the pixel circuit CR12 via a connection portion CT11. The pixel electrode PE12 has an L-shaped form corresponding to the shape of the segment SG12, and is electrically connected to the pixel circuit CR13 via a connection portion CT12. The pixel electrode PE13 has an L-shaped form corresponding to the shape of the segment SG13, and is electrically connected to the pixel circuit CR11 via a connection portion CT13. The ratio of the areas of pixel electrode PE11, pixel electrode PE12, and pixel electrode PE13 is, for example, 1:2:4 ($=2^0:2^1:2^2$).

Similarly, in the sub-pixel P2, a pixel electrode PE21 is electrically connected to the pixel circuit CR22 via a connection portion CT21, a pixel electrode PE22 is electrically connected to the pixel circuit CR21 via a connection portion CT22, and a pixel electrode PE23 is electrically connected to the pixel circuit CR23 via a connection portion CT23. In the sub-pixel P3, a pixel electrode PE31 is electrically connected to the pixel circuit CR32 via a connection portion CT31, a pixel electrode PE32 is electrically connected to the pixel circuit CR33 via a connection portion CT32, and a pixel electrode PE33 is electrically connected to the pixel circuit CR31 via a connection portion CT33. In the sub-pixel P4, a pixel electrode PE41 is electrically connected to the pixel circuit CR42 via a connection portion CT41, a pixel electrode PE42 is electrically connected to the pixel circuit CR41 via a connection portion CT42, and a pixel electrode PE43 is electrically connected to the pixel circuit CR43 via a connection portion CT43.

FIG. 9 is a plan view for describing the positional relationship between the pixel electrode and the color filter in the main pixel PX shown in FIG. 8.

The sub-pixel P1 includes color filters CF11 to CF13 opposed to the pixel electrodes PE11 to PE13, respectively. The color filters CF11 to CF13 are green color filters.

Similarly, the sub-pixel P2 includes color filters CF21 to CF23 opposed to the pixel electrodes PE21 to PE23, respectively, the sub-pixel P3 includes color filters CF31 to CF33 opposed to the pixel electrodes PE31 to PE33, respectively, and the sub-pixel P4 includes color filters CF41 to CF43 opposed to the pixel electrodes PE41 to PE43, respectively. The color filters CF21 to CF23 are red color filters, the color filters CF31 to CF33 are blue color filters, and the color filters CF41 to CF43 are white color filters or transparent layers. A light-shielding layer BM represented by hatching in the drawing is disposed between the respective color filters.

If the colors of the sub-pixels P1 to P4 are different from the colors shown in FIG. 8, as described above, the colors of their respective color filters may be changed.

FIG. 10 is an illustration showing a cross-section of the first substrate SUB1 shown in FIG. 3. The illustration shows a cross-section of the switch portion SW1 shown in FIG. 6, a node electrode EN which serves as the output node Nout, and the pixel electrode PE.

The switch portion SW1 includes a semiconductor layer SC, a gate electrode GE, and a first electrode E11 and a second electrode E12 corresponding to a source and a drain. The semiconductor layer SC is located on the first insulating substrate 10, and is covered with a first insulating film 11. The gate electrode GE is located on the first insulating film 11, and is covered with a second insulating film 12. The first electrode E11 and the second electrode E12 are located on the second insulating film 12, are in contact with the semiconductor layer SC, and is covered with a third insulating film 13. The gate electrode GE, the first electrode E11, and the second electrode E12 are electrically connected to the scanning line G, the signal line S, and the latch portion LT, respectively.

The node electrode EN is an electrode connected to the other ends of the switch portions SW2 and SW3 shown in FIG. 6. The node electrode EN is located on the second insulating film 12, and is covered with the third insulating film 13. The pixel electrode PE is located on the third insulating film 13, and is covered with the first alignment film AL1. The pixel electrode PE is in contact with the node electrode EN through a contact hole CH which penetrates the third insulating film 13. A portion at which the pixel electrode PE and the node electrode EN contact each other through the contact hole CH corresponds to the connection portion CT explained referring to FIG. 8.

The first insulating film 11 and the second insulating film 12 are formed of an inorganic material such as silicon nitride or silicon oxide. The third insulating film 13 is formed of an organic material such as resin. Note that the pixel circuit CR including not only the switch portion SW1 but also the node electrode EN is located between the first insulating substrate 10 and the third insulating film 13. Also, although the details of the peripheral circuits Cr1 to Cr4 are omitted, they include an re-channel MOS transistor and a p-channel MOS transistor likewise the switch portion SW1, and are located between the first insulating substrate 10 and the third insulating film 13. Further, in the example illustrated, while the switch portion SW1 is of a top-gate type in which the gate electrode GE is located above the semiconductor layer SC, it may be of a bottom-gate type in which the gate electrode GE is located below the semiconductor layer SC. Furthermore, although the switch portion SW1 illustrated in the drawing is of a single-gate structure in which one gate electrode GE is opposed to the semiconductor layer SC, it may be of a double-gate structure in which two gate electrodes GE are opposed to the semiconductor layer SC.

Next, a configuration example of the pixel block B applicable in the present embodiment will be described.

Figure 11:
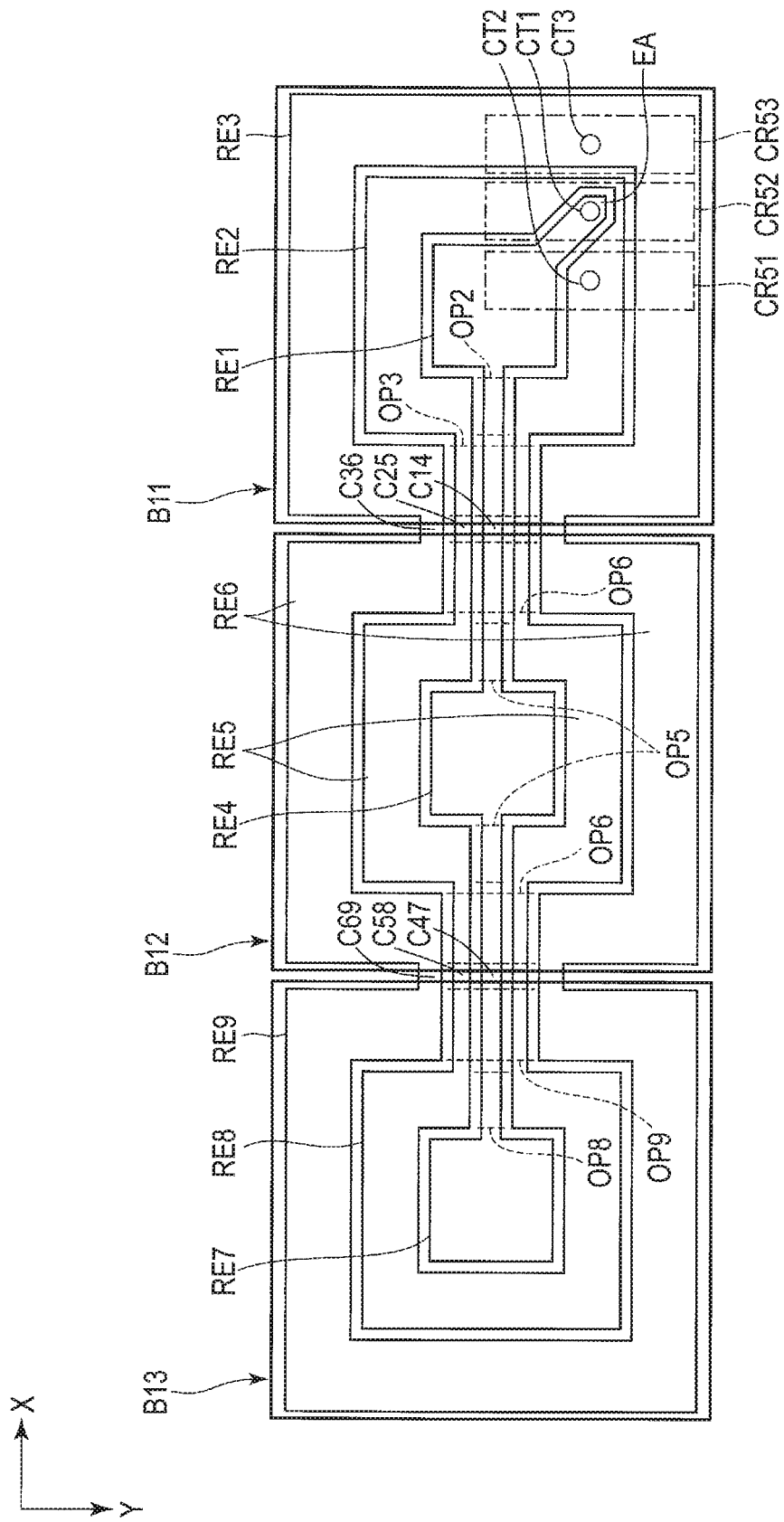
FIG. 11 is a plan view showing a configuration example of a pixel block B.

FIG. 11 is a plan view showing a configuration example of the pixel block B. Here, a configuration example of the pixel blocks B11 to B13 shown in FIG. 2 will be described. In the example illustrated in FIG. 11, the pixel block B11 corresponds to the first pixel block, the pixel block B12 corresponds to the second pixel block, and the pixel block B13 corresponds to the third pixel block.

The pixel block B11 comprises pixel circuits CR51 to CR53, and reflective electrodes RE1 to RE3. Here, it is assumed that the pixel circuits CR51 to CR53 are formed in areas, each represented by a one-dot chain line in the drawing. Although the specific structures of the pixel circuits are not illustrated, the structures can be any as long as they can each realize the equivalent circuit shown in FIG. 6. In the example illustrated, the pixel circuits CR51 to CR53 have the same structure as the structures of the pixel circuits CR41 to CR43 of the sub-pixel P4 which exhibits white shown in FIG. 8, and are configured to hold data for white display. That is, the pixel block B11 is driven based on gradation data of a white sub-pixel, the color of which has the highest reflectivity among green, red, blue, and white.

The reflective electrode RE1 is located at the central portion of the pixel block B11, and has a square shape, and a part EA of the same extends to an area which overlaps the pixel circuit CR52. The reflective electrode RE1 is electrically connected to the pixel circuit CR52 via a connection portion CT1. The reflective electrode RE2 is located outside the reflective electrode RE1, surrounds the reflective electrode RE1, and has a C-shaped form having an opening OP2 at a position adjacent to the pixel block B12. The reflective electrode RE2 is electrically connected to the pixel circuit CR51 via a connection portion CT2. The reflective electrode RE3 is located outside the reflective electrode RE2 (in other words, at a peripheral portion of the pixel block B11), surrounds the reflective electrode RE2, and has a C-shaped form having an opening OP3 between the pixel block B12 and the opening OP2. The reflective electrode RE3 is electrically connected to the pixel circuit CR53 via a connection portion CT3. In the pixel block B11 described above, the ratio of the areas of reflective electrode RE1, reflective electrode RE2, and reflective electrode RE3 is, for example, $1:2:4$ ($=2^0:2^1:2^2$).

The pixel block B12 does not include a pixel circuit, but includes reflective electrodes RE4 to RE6. The reflective electrode RE4 is located at the central portion of the pixel block B12, and has a square shape. The reflective electrode RE5 is located outside the reflective electrode RE4, surrounds the reflective electrode RE4, and has openings OP5 at positions adjacent to the pixel blocks B11 and B13, respectively. The reflective electrode RE6 is located outside the reflective electrode RE5 (in other words, at a peripheral portion of the pixel block B12), surrounds the reflective electrode RE5, and has openings OP6 at positions adjacent to the pixel blocks B11 and B13, respectively. In the pixel block B12 described above, the ratio of the areas of reflective electrode RE4, reflective electrode RE5, and reflective electrode RE6 is, for example, $1:2:4$ ($=2^0:2^1:2^2$).

The reflective electrodes RE3 and RE6 are connected to each other via a connection portion C36 extending between the pixel block 311 and the pixel block B12. The reflective electrodes RE2 and RE5 are connected to each other via a connection portion C25 which passes through the opening OP3 of the pixel block B11 and the opening OP6 of the pixel block B12. The reflective electrodes RE1 and RE4 are connected to each other via a connection portion C14 which passes through the openings OP2 and OP3 of the pixel block B11 and the openings OP5 and OP6 of the pixel block B12.

Similarly, the pixel block B13 does not include a pixel circuit, but includes reflective electrodes RE7 to RE9. Although the details are omitted, the reflective electrodes RE6 and RE9 are connected to each other via a connection portion C69 extending between the pixel block B12 and the pixel block B13. The reflective electrodes RE5 and RE8 are connected to each other via a connection portion C58 which passes through the opening OP6 of the pixel block B12 and an opening OP9 of the pixel block B13. The reflective electrodes RE4 and R7 are connected to each other via a connection portion C47 which passes through the openings OP5 and OP6 of the pixel block B12 and openings OP8 and OP9 of the pixel block B13.

Note that the above-described relationship of connection regarding the pixel blocks B11 to B13 can be applied to that of the pixel blocks B21 to B23.

Figure 12:
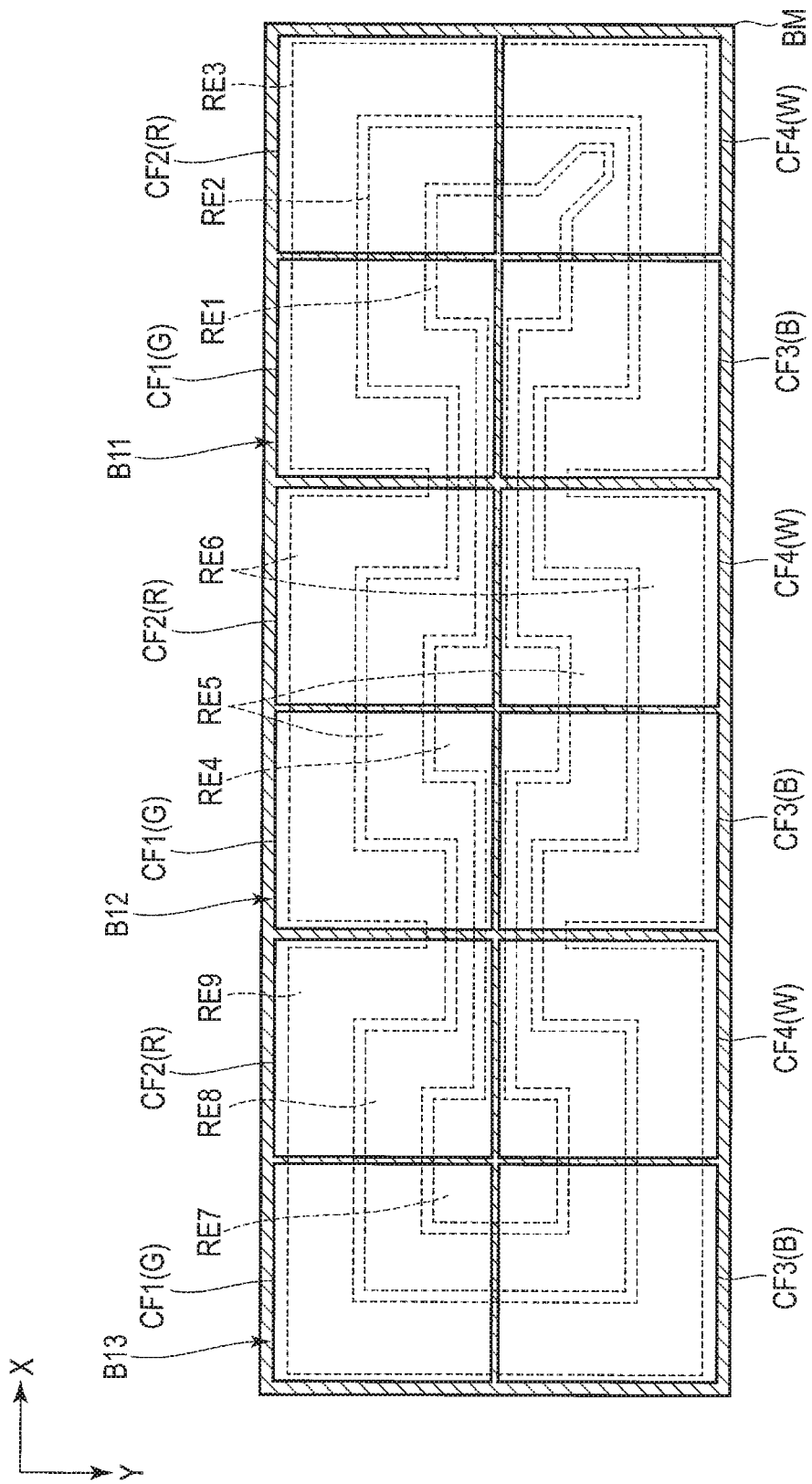
FIG. 12 is a plan view for describing a positional relationship between a reflective electrode and a color filter in pixel blocks B11 to B13 shown in FIG. 11.

FIG. 12 is a plan view for describing the positional relationship between the reflective electrode and the color filter in the pixel blocks B11 to B13 shown in FIG. 11.

The pixel block B11 is divided into four substantially equal areas, and includes color filters CF1 to CF4 in the respective regions. In one example, the color filters CF1 to CF4 are color filters of green (G), red (R), blue (B), and white (W), respectively. In the pixel block B11 illustrated, the color filter CF1 is located at the upper left region, the color filter CF2 is located at the upper right region, the color filter CF3 is located at the lower left region, and the color filter CF4 is located at the lower right region. These color filters CF1 to CF4 are all opposed to the reflective electrodes RE1 to RE3.

Similarly, in each of the pixel blocks B12 and B13, the color filters CF1 to CF4 are arranged. The color filters CF1 to CF4 of the pixel block B12 are all opposed to the reflective electrodes RE4 to RE6, and the color filters CF1 to CF4 of the pixel block B13 are all opposed to the reflective electrodes RE7 to RE9. The light-shielding layer BM represented by hatching in the drawing is disposed between the respective pixel blocks, and between the respective color filters.

As described above, according to the configuration examples illustrated in FIGS. 11 and 12, in the pixel block B11 including the pixel circuits, the entire pixel block B11 is driven based on gradation data similar to that of the white sub-pixel, as described above. Each of the color filters CF1 to CF4 disposed in the pixel block B11 has an area equal to one another, and is opposed to the reflective electrodes RE1 to RE3. Accordingly, the pixel block B11 can implement gradation display of an achromatic color such as white, black or gray. Also, each of the reflective electrodes in the pixel blocks B12 and B13 not including the pixel circuits is electrically connected to the corresponding one of the reflective electrodes of the pixel block B11, and is driven similarly to the pixel block B11 based on the gradation data supplied to the pixel circuits of the pixel block B11. Accordingly, the pixel blocks B12 and B13 can implement gradation display of an achromatic color likewise the pixel block B11.

Figure 13A:
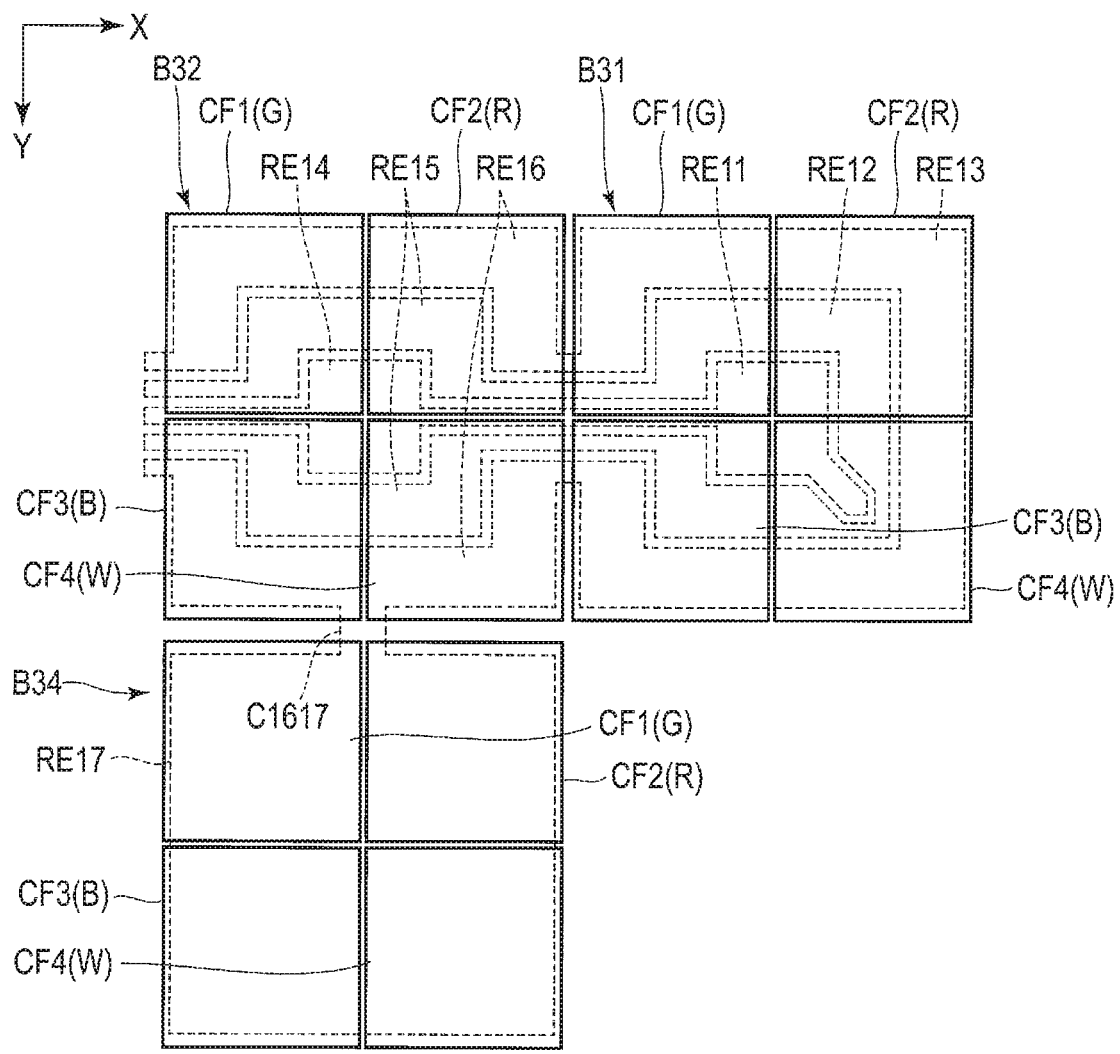
FIG. 13A is a plan view showing a configuration example of a corner portion CN shown in FIG. 2.

FIG. 13A is a plan view showing a configuration example of the corner portion CN shown in FIG. 2, and is a figure for explaining the positional relationship between the reflective electrode and the color filter in the pixel blocks B31, B32, and B34. In the example illustrated in FIG. 13A, the pixel block B31 corresponds to the first pixel block, the pixel block B32 corresponds to the second pixel block, and the pixel block B34 corresponds to the third pixel block.

The pixel blocks B31 and B32 are adjacent to each other in the first direction X, and the pixel blocks B32 and B34 are adjacent to each other in the second direction Y.

Though not described in detail, the pixel block B31 is structured similarly to the pixel block B11 shown in FIG. 11, and includes the pixel circuits not shown, and reflective electrodes RE11 to RE13. The shapes of the reflective electrodes RE11 to RE13 are the same as those of the reflective electrodes RE1 to RE3 shown in FIG. 11. Though not described in detail, the pixel block B32 is structured similarly to the pixel block B12 shown in FIG. 11, and includes reflective electrodes RE14 to RE16. The shapes of the reflective electrodes RE14 to RE16 are the same as those of the reflective electrodes RE4 to RE6 shown in FIG. 11.

The pixel block B34 includes a single reflective electrode RE17. That is, the reflective electrode RE17 has a square shape corresponding to the shape of the pixel block B34. The reflective electrode RE17 is electrically connected to the reflective electrode RE16 having the greatest area (that is, the area corresponding to the most significant bit) in the adjacent pixel block B32. The reflective electrodes RE16 and RE17 are connected to each other via a connection portion C1617 extending between the pixel block B32 and the pixel block B34.

The pixel block B34 is divided into four substantially equal areas, and includes the color filters CF1 to CF4 in the respective regions. These color filters CF1 to CF4 are all opposed to the reflective electrode RE17. The color filters CF1 to CF4 are substantially equal to each other in terms of the area in which the color filters CF1 to CF4 are opposed to the reflective electrode RE17.

Note that the pixel blocks B35 and B36 are structured similarly to the pixel block B34.

According to such a configuration example, in the pixel block B34 not including the pixel circuits, since the reflective electrode RE17 is connected to the reflective electrode RE16 corresponding to the most significant bit in the adjacent pixel block B32, the reflective electrode RE17 is driven similarly to the reflective electrode RE16. That is, the pixel block B34 can implement one-bit gradation display in accordance with the most significant bit of the pixel block B32.

As described above, in the corner portion CN, the electrical connection between the pixel blocks not including the pixel circuits can be complicated. However, as in the present configuration example, since one pixel block includes a single reflective electrode, and this reflective electrode is connected to the reflective electrode corresponding to the most significant bit in the adjacent pixel block, gradation display of at least one bit can be implemented, and it is possible to cause the single reflective electrode to contribute to display in the display area DA.

Figure 13B:
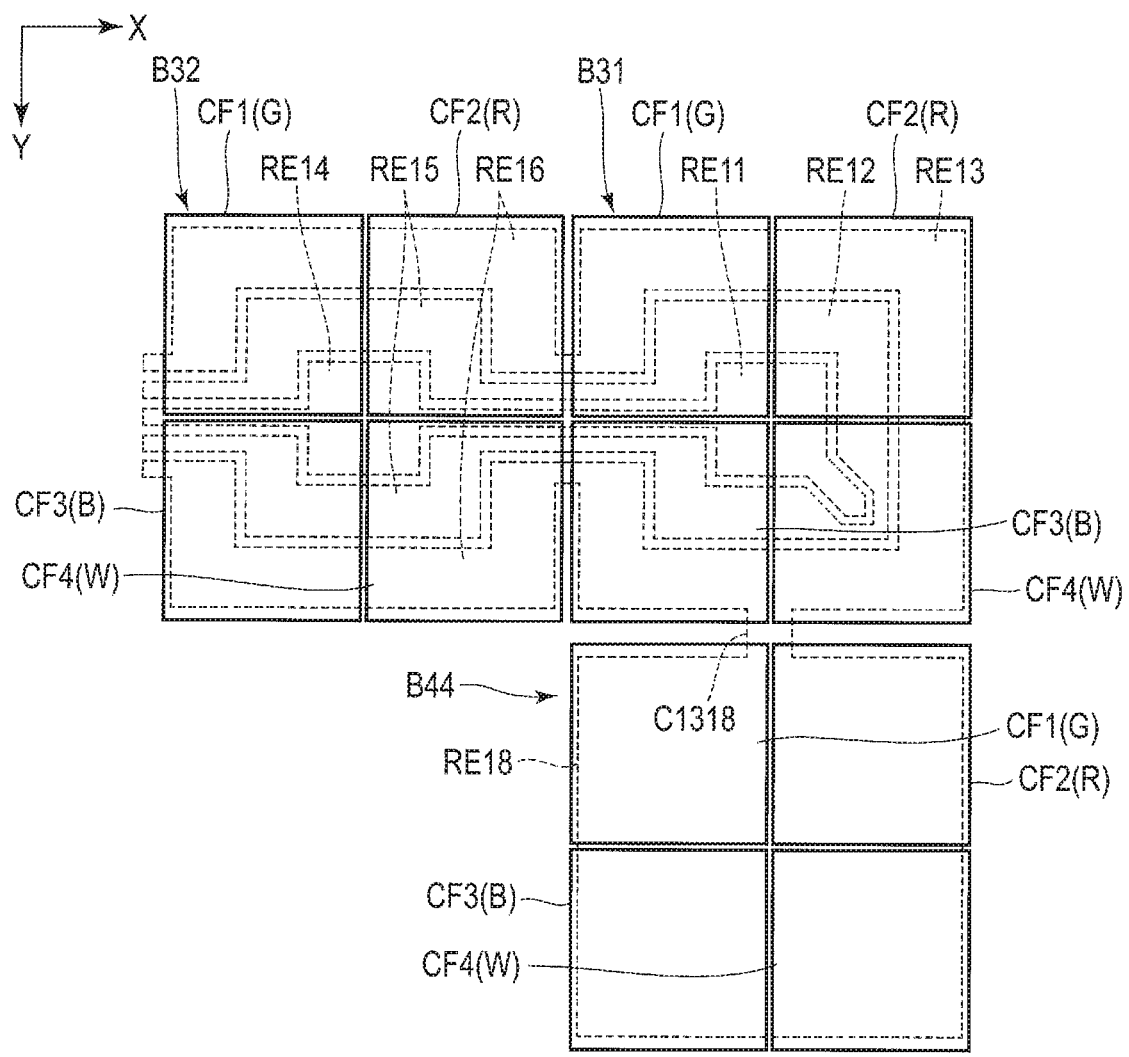
FIG. 13B is a plan view showing another configuration example of the corner portion CN shown in FIG. 2.

FIG. 13B is a plan view showing another configuration example of the corner portion CN shown in FIG. 2, and is a figure for explaining the positional relationship between the reflective electrode and the color filter in the pixel blocks B31, B32, and B44. Note that in the example illustrated in FIG. 2, the pixel block B44 is connected to the pixel block B42. However, in this example, it is assumed that the pixel block B44 is connected to the pixel block B31. In the example illustrated in FIG. 13B, the pixel block B31 corresponds to the first pixel block, the pixel block B32 corresponds to the second pixel block, and the pixel block B44 corresponds to the third pixel block.

The pixel blocks B31 and B32 are adjacent to each other in the first direction X, and the pixel blocks B31 and B44 are adjacent to each other in the second direction Y. Explanation of the pixel blocks B31 and B32 is omitted.

The pixel block B44 includes a single reflective electrode RE18. That is, the reflective electrode RE18 has a square shape corresponding to the shape of the pixel block B44. The reflective electrode RE18 is electrically connected to the reflective electrode RE13 having the greatest area (that is, the area corresponding to the most significant bit) in the adjacent pixel block B31. The reflective electrodes RE13 and RE18 are connected to each other by a connection portion C1318 extending between the pixel block B31 and the pixel block B44.

The pixel block B44 is divided into four substantially equal areas, and includes the color filters CF1 to CF4 in the respective regions. These color filters CF1 to CF4 are all opposed to the reflective electrode RE18. The color filters CF1 to CF4 are substantially equal to each other in terms of the area in which the color filters CF1 to CF4 are opposed to the reflective electrode RE18.

Note that the pixel blocks B45 and B46 are structured similarly to the pixel block B44.

Also in this configuration example, the same advantages as those of the configuration example shown in FIG. 13A can be obtained.

Figure 14:
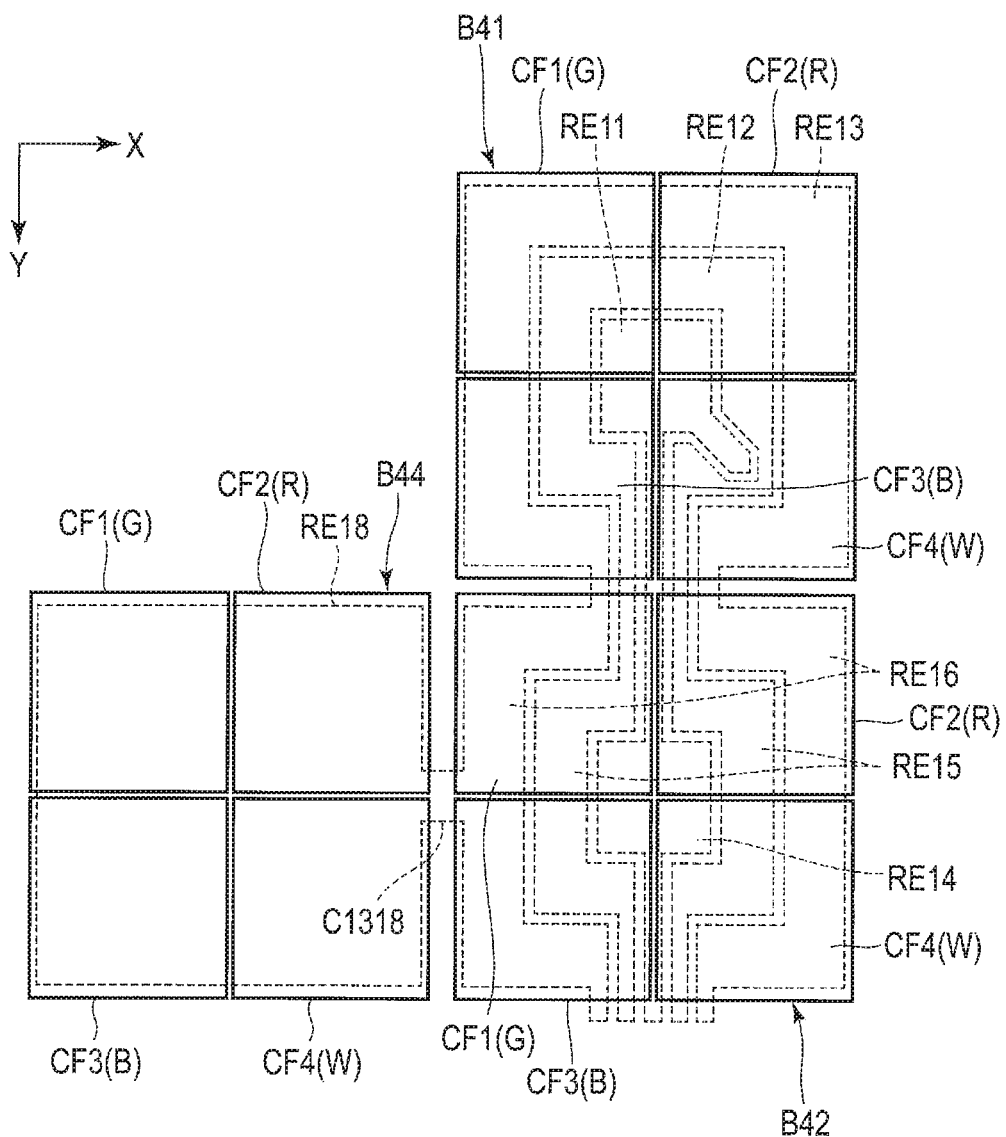
FIG. 14 is a plan view showing yet another configuration example of the corner portion CN shown in FIG. 2.

FIG. 14 is a plan view showing yet another configuration example of the corner portion CN shown in FIG. 2, and is a figure for explaining the positional relationship between the reflective electrode and the color filter in the pixel blocks B41, B42, and B44. In the example illustrated in FIG. 14, the pixel block B41 corresponds to the first pixel block, the pixel block B42 corresponds to the second pixel block, and the pixel block B44 corresponds to the third pixel block.

The pixel blocks B41 and B42 are adjacent to each other in the second direction Y, and the pixel blocks B42 and B44 are adjacent to each other in the first direction X.

Though not described in detail, the pixel block B41 is structured similarly to the pixel block B31 shown in FIG. 13A, and includes the pixel circuits not shown, and reflective electrodes RE11 to RE13. The pixel block B42 includes the reflective electrodes RE14 to RE16, though not described in detail. The reflective electrode RE14 is connected to the reflective electrode RE11, the reflective electrode RE15 is connected to the reflective electrode RE12, and the reflective electrode RE16 is connected to the reflective electrode RE13.

The pixel block B44 includes a single reflective electrode RE18. That is, the reflective electrode RE18 has a square shape corresponding to the shape of the pixel block B44. The reflective electrode RE18 is electrically connected to the reflective electrode RE16 having the greatest area (that is, the area corresponding to the most significant bit) in the adjacent pixel block B42. The reflective electrodes RE16 and RE18 are connected to each other by a connection portion C1618 extending between the pixel block B42 and the pixel block B44.

The pixel block B44 is divided into four substantially equal areas, and includes the color filters CF1 to CF4 in the respective regions. These color filters CF1 to CF4 are all opposed to the reflective electrode RE18. The color filters CF1 to CF4 are substantially equal to each other in terms of the area in which the color filters CF1 to CF4 are opposed to the reflective electrode RE18.

Also in this configuration example, the same advantages as those of the configuration example shown in FIG. 13A can be obtained.

Embodiment 2

In Embodiment 1, a case where the main pixel PX and the pixel block B both have a structure corresponding to 3 bits has been described. In the present embodiment, an example of a case where a main pixel PX and a pixel block B both have a structure corresponding to 2 bits will be described. Note that the structures of the present embodiment similar to those of Embodiment 1 will not be described, and elements with the same reference numbers as those of Embodiment 1 denote the same elements.

First, a configuration example of the main pixel PX will be described.

Figure 15:
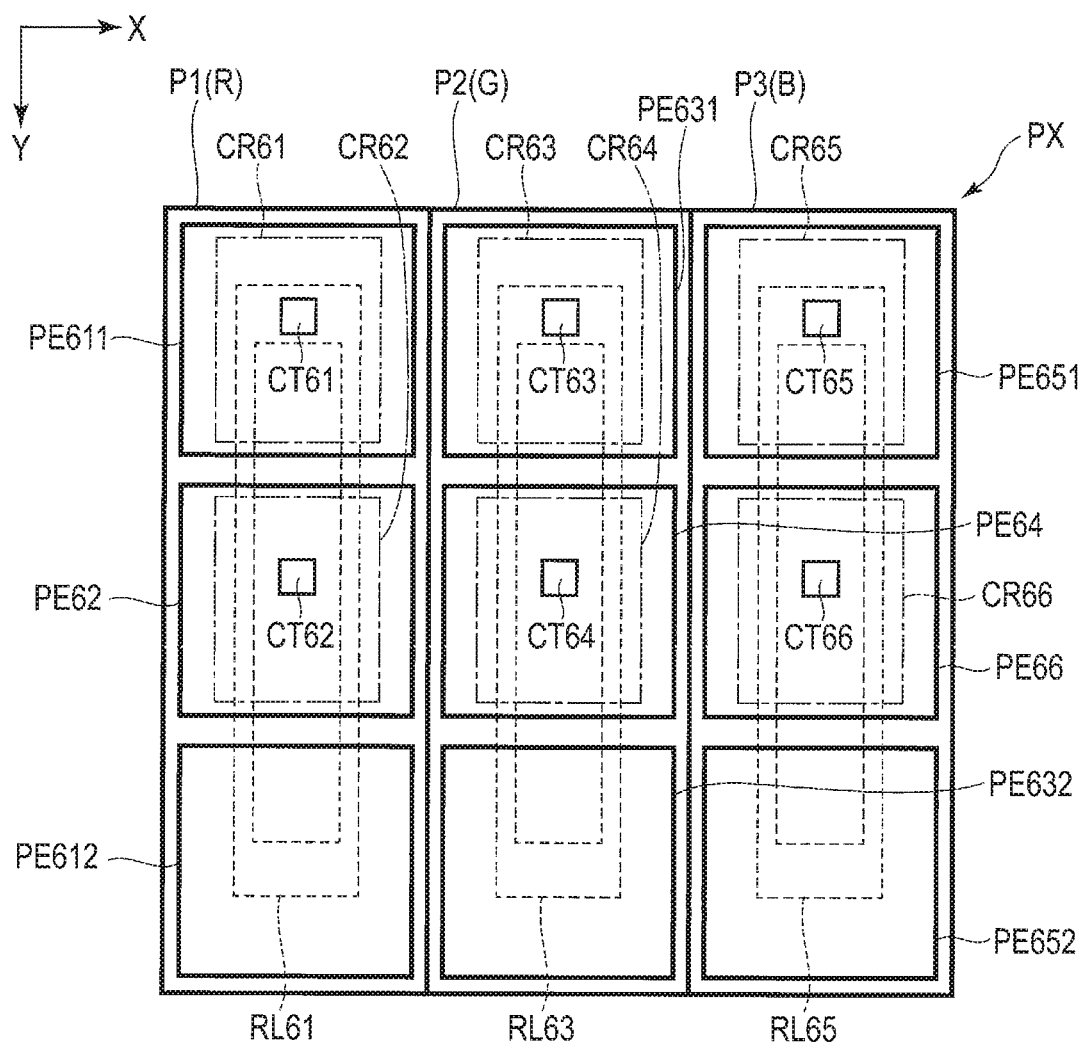
FIG. 15 is a plan view showing a configuration example of the main pixel PX.

FIG. 15 is a plan view showing a configuration example of the main pixel PX. The main pixel PX has the shape of a square in which the length in the first direction X and the length in the second direction Y are substantially the same. The main pixel PX comprises three sub-pixels P1 to P3. The sub-pixels P1 to P3 are arranged in the first direction X. Areas of the sub-pixels P1 to P3 are substantially the same. In each of the sub-pixels P1 to P3, the ratio of the length in the first direction X to the length in the second direction Y is 1:3. The sub-pixels P1 to P3 exhibit different colors. In one example, the sub-pixel P1 exhibits red (R), the sub-pixel P2 exhibits green (G), and the sub-pixel P3 exhibits blue (B).

In the main pixel PX, each of the sub-pixels P1 to P3 has a structure similar to the structure for implementing 2-bit gradation display. The structure of each of the sub-pixels will be described in detail below. Here, an explanation will be given by taking the sub-pixel P1 as an example, and detailed explanations of the other sub-pixels will be omitted.

The sub-pixel P1 comprises pixel circuits CR61 and CR62, and pixel electrodes PE611, PE62, and PE612. Here, each of the pixel circuits CR61 and CR62 is indicated by a one-dot chain line in the drawing. Each of the pixel electrodes PE611, PE62, and PE612 has an area equal to one another, and those pixel electrodes are arranged in the second direction Y. The pixel electrodes PE611 and PE612 are electrically connected to each other by a relay electrode RL61. The relay electrode RL61 is electrically connected to the pixel circuit CR61 via a connection portion CT61. The pixel electrode PE62 is electrically connected to the pixel circuit CR62 via a connection portion CT62. That is, in the sub-pixel P1, of the three pixel electrodes arranged in the second direction Y, the pixel electrode PE62 located in the middle and the two pixel electrodes PE611 and PE612 located at the both ends are driven independently. The ratio of a total area of the pixel electrode PE611 and the pixel electrode PE612 to the area of the pixel electrode PE62 is, for example, 2:1 ($=2^1:2^0$).

Similarly, in the sub-pixel P2, a relay electrode RL63 electrically connects pixel electrodes PE631 and PE632 to each other, and is electrically connected to a pixel circuit CR63 via a connection portion CT63. A pixel electrode PE64 is electrically connected to a pixel circuit CR64 via a connection portion CT64. In the sub-pixel P3, a relay electrode RL65 electrically connects pixel electrodes PE651 and PE652 to each other, and is electrically connected to a pixel circuit CR65 via a connection portion CT65. A pixel electrode PE66 is electrically connected to a pixel circuit CR66 via a connection portion CT66.

Figure 16:
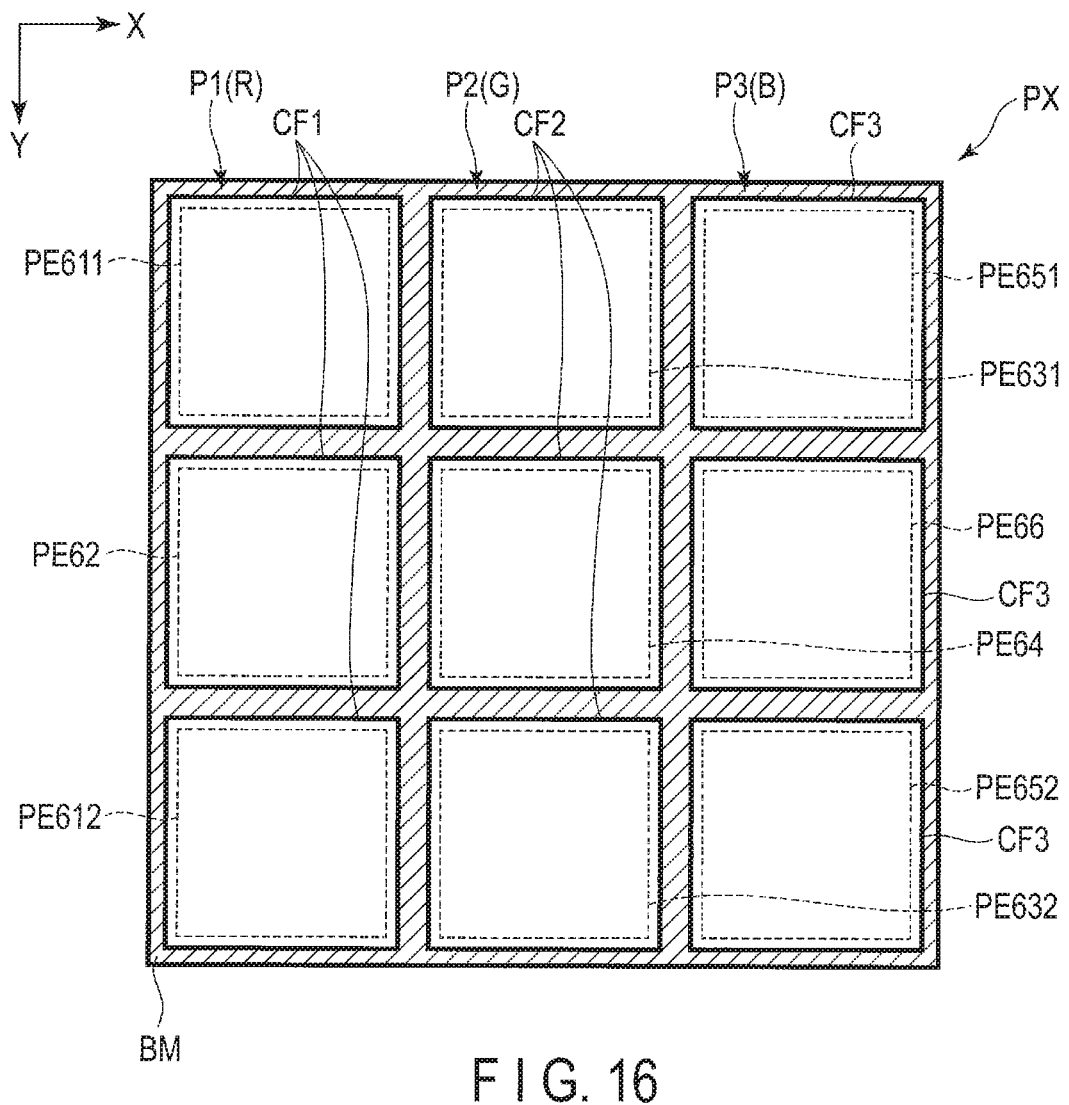
FIG. 16 is a plan view for describing a positional relationship between a pixel electrode and a color filter in the main pixel PX shown in FIG. 15.

FIG. 16 is a plan view for describing the positional relationship between the pixel electrode and the color filter in the main pixel PX shown in FIG. 15.

The sub-pixel P1 includes color filters CF1 opposed to the pixel electrodes PE611, PE62, and PE612, respectively. The sub-pixel P2 includes color filters CF2 opposed to the pixel electrodes PE631, PE64, and PE632, respectively. The sub-pixel P3 includes color filters CF3 opposed to the pixel electrodes PE651, PE66, and PE652, respectively. The color filter CF1 is a red color filter, the color filter CF2 is a green color filter, and the color filter CF3 is a blue color filter. A light-shielding layer BM represented by hatching in the drawing is disposed between the respective color filters.

Next, a configuration example of the pixel block B will be described.

Figure 17:
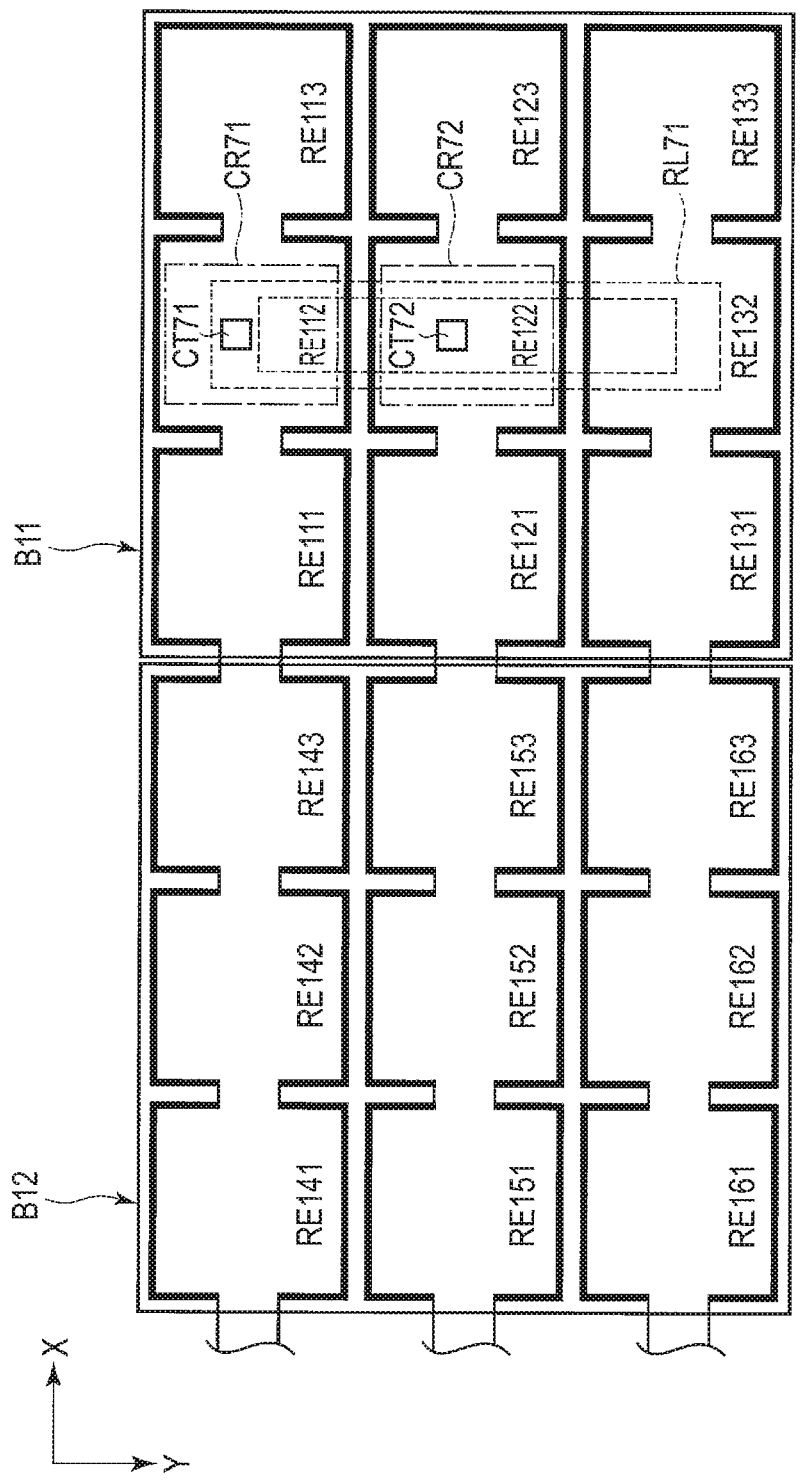
FIG. 17 is a plan view showing a configuration example of the pixel block B.

FIG. 17 is a plan view showing a configuration example of the pixel block B. Here, a configuration example of the pixel blocks B11 and B12 shown in FIG. 2 will be described.

The pixel block B11 comprises pixel circuits CR71 and CR72, reflective electrodes RE111 to RE113, RE121 to RE123, and RE131 to RE133, and a relay electrode RL71. Here, each of the pixel circuits CR71 and CR72 is indicated by a one-dot chain line in the drawing. In the example illustrated, the pixel circuits CR71 and CR72 have the same structures as the structures of the pixel circuits CR63 and CR64 of the sub-pixel P2 which exhibits green shown in FIG. 15, and are configured to hold data for green display. That is, the pixel block B11 is driven based on gradation data of a green sub-pixel, the color of which has the highest reflectivity among green, red, and blue.

In the pixel block B11, the reflective electrodes RE111 to RE113 are located on the upper side of the drawing, the reflective electrodes RE121 to RE123 are located at the central portion of the drawing, and the reflective electrodes RE131 to RE133 are located on the lower side of the drawing. Each of the reflective electrodes RE111 to RE113, RE121 to RE123, and RE131 to RE133 has the same shape, and the same area. The reflective electrodes RE111 to RE113 are arranged in the first direction X, and are connected to each other. The reflective electrodes RE121 to RE123 are arranged in the first direction X, and are connected to each other. The reflective electrodes RE131 to RE133 are arranged in the first direction X, and are connected to each other.

The relay electrode RL71 electrically connects the reflective electrode RE112 and RE132 to each other, and is electrically connected to the pixel circuit CR71 via a connection portion CT71. The reflective electrode RE122 is electrically connected to the pixel circuit CR72 via a connection portion CT72. In the pixel block B11 described above, the ratio of a total area of the reflective electrodes RE111 to RE113 and RE131 to RE133 to the area of the reflective electrodes RE121 to RE123 is, for example, 2:1 ($=2^1:2^0$).

The pixel block B12 does not include a pixel circuit, but includes reflective electrodes RE141 to RE143, RE151 to RE153, and RE161 to RE163. The reflective electrodes RE141 to RE143 are arranged in the first direction X, and are connected to each other, and the reflective electrodes RE141 to RE143 and the reflective electrodes RE111 to RE113 are located on the same straight line. The reflective electrode RE143 is connected to the reflective electrode RE111. The reflective electrodes RE151 to RE153 are arranged in the first direction X, and are connected to each other, and the reflective electrodes RE151 to RE153 and the reflective electrodes RE121 to RE123 are located on the same straight line. The reflective electrode RE153 is connected to the reflective electrode RE121. The reflective electrodes RE161 to RE163 are arranged in the first direction X, and are connected to each other, and the reflective electrodes RE161 to RE163 and the reflective electrodes RE131 to RE133 are located on the same straight line. The reflective electrode RE163 is connected to the reflective electrode RE131. In the pixel block B12 described above, the ratio of a total area of the reflective electrodes RE141 to RE143 and RE161 to RE163 to the area of the reflective electrodes RE151 to RE153 is, for example, 2:1 ($=2^1:2^0$).

FIG. 18 is a plan view for describing the positional relationship between the reflective electrode and the color filter in the pixel blocks B11 and B12 shown in FIG. 17.

The pixel block B11 is divided into three substantially equal areas, and includes color filters CF1 to CF3 in the respective regions. In one example, the color filters CF1 to CF3 are color filters of red (R), green (G), and blue (B), respectively. In the pixel block B11 illustrated, the color filter CF1 is located at the left region, the color filter CF3 is located at the right region, and the color filter CF2 is located between the color filters CF1 and CF3. The color filter CF1 is opposed to the reflective electrodes RE111, RE121, and RE131. The color filter CF2 is opposed to the reflective electrodes RE112, RE122, and RE132. The color filter CF3 is opposed to the reflective electrodes RE113, RE123, and RE133.

Similarly, in the pixel block B12, each of the color filters CF1 to CF3 is arranged. The color filter CF1 is opposed to the reflective electrodes RE141, RE151, and RE161. The color filter CF2 is opposed to the reflective electrodes RE142, RE152, and RE162. The color filter CF3 is opposed to the reflective electrodes RE143, RE153, and RE163. The light-shielding layer BM represented by hatching in the drawing is disposed between the respective pixel blocks, and between the respective color filters.

As described above, according to the configuration examples illustrated in FIGS. 17 and 18, in the pixel block B11 including the pixel circuits, the entire pixel block B11 is driven based on gradation data similar to that of the green sub-pixel, as described above. Each of the color filters CF1 to CF3 disposed in the pixel block B11 has an area equal to one another, and is opposed to the reflective electrodes. Accordingly, the pixel block B11 can implement gradation display of an achromatic color such as white, black or gray. Also, each of the reflective electrodes in the pixel block B12 not including the pixel circuits is connected to the corresponding one of the reflective electrodes of the pixel block B11, and is driven similarly to the pixel block B11 based on the gradation data supplied to the pixel circuits of the pixel block B11. Accordingly, the pixel blocks B12 can implement gradation display of an achromatic color likewise the pixel block B11.

FIG. 19 is a plan view for describing the positional relationship between the reflective electrode and the color filter in the pixel blocks B21 and B22 shown in FIG. 2.

The pixel block B21 includes pixel circuits CR81 to CR83, reflective electrodes RE211 to RE213, RE221 to RE223, and RE231 to RE233. Here, each of the pixel circuits CR81 to CR83 is indicated by a one-dot chain line in the drawing, and each of the reflective electrodes RE211 to RE213, RE221 to RE223, and RE231 to RE233 is indicated by a dotted line in the drawing. The pixel circuits CR81 to CR83 are structured to be the same as the pixel circuits CR61, CR63, and CR65 shown in FIG. 15. That is, the pixel block B21 is driven based on gradation data of the most significant bit for each of green, red, and blue.

In the pixel block B21, the reflective electrodes RE211 to RE213 are located on the left side of the drawing, the reflective electrodes RE221 to RE223 are located at the central portion of the drawing, and the reflective electrodes RE231 to RE233 are located on the right side of the drawing. Each of the reflective electrodes RE211 to RE213, RE221 to RE223, and RE231 to RE233 has the same shape, and the same area. The reflective electrodes RE211 to RE213 are arranged in the second direction Y, are connected to each other, and are electrically connected to the pixel circuit CR81 via a connection portion CT81. The reflective electrodes RE221 to RE223 are arranged in the second direction Y, are connected to each other, and are electrically connected to the pixel circuit CR82 via a connection portion CT82. The reflective electrodes RE231 to RE233 are arranged in the second direction Y, are connected to each other, and are electrically connected to the pixel circuit CR83 via a connection portion CT83.

The pixel block B22 does not include a pixel circuit, but includes reflective electrodes RE241 to RE243, RE251 to RE253, and RE261 to RE263. The reflective electrodes RE241 to RE243 are arranged in the second direction Y, and are connected to each other, and the reflective electrodes RE241 to RE243 and the reflective electrodes RE211 to RE213 are located on the same straight line. The reflective electrode RE241 is connected to the reflective electrode RE213. The reflective electrodes RE251 to RE253 are arranged in the second direction Y, and are connected to each other, and the reflective electrodes RE251 to RE253 and the reflective electrodes RE221 to RE223 are located on the same straight line. The reflective electrode RE251 is connected to the reflective electrode RE223. The reflective electrodes RE261 to RE263 are arranged in the second direction Y, and are connected to each other, and the reflective electrodes RE261 to RE263 and the reflective electrodes RE231 to RE233 are located on the same straight line. The reflective electrode RE261 is connected to the reflective electrode RE233.

In the pixel block B21, the color filter CF1 is opposed to the reflective electrodes RE211 to RE213, the color filter CF2 is opposed to the reflective electrodes RE221 to RE223, and the color filter CF3 is opposed to the reflective electrodes RE231 to RE233.

In the pixel block B22, the color filter CF1 is opposed to the reflective electrodes RE241 to RE243, the color filter CF2 is opposed to the reflective electrodes RE251 to RE253, and the color filter CF3 is opposed to the reflective electrodes RE261 to RE263. The light-shielding layer BM represented by hatching in the drawing is disposed between the respective pixel blocks, and between the respective color filters.

According to such a configuration example, in the pixel block B21 including the pixel circuits CR81 to CR83 corresponding to green, red, and blue, a color can be displayed with an 8-level gradation. Also, each of the reflective electrodes in the pixel block B22 not including the pixel circuits is connected to the corresponding one of the reflective electrodes of the pixel block B21, and is driven similarly to the pixel block B21 based on the gradation data supplied to the pixel circuits CR81 to CR83 of the pixel block B21. Accordingly, the pixel block B22 can display a color with an 8-level gradation likewise the pixel block B21.

Figure 20A:
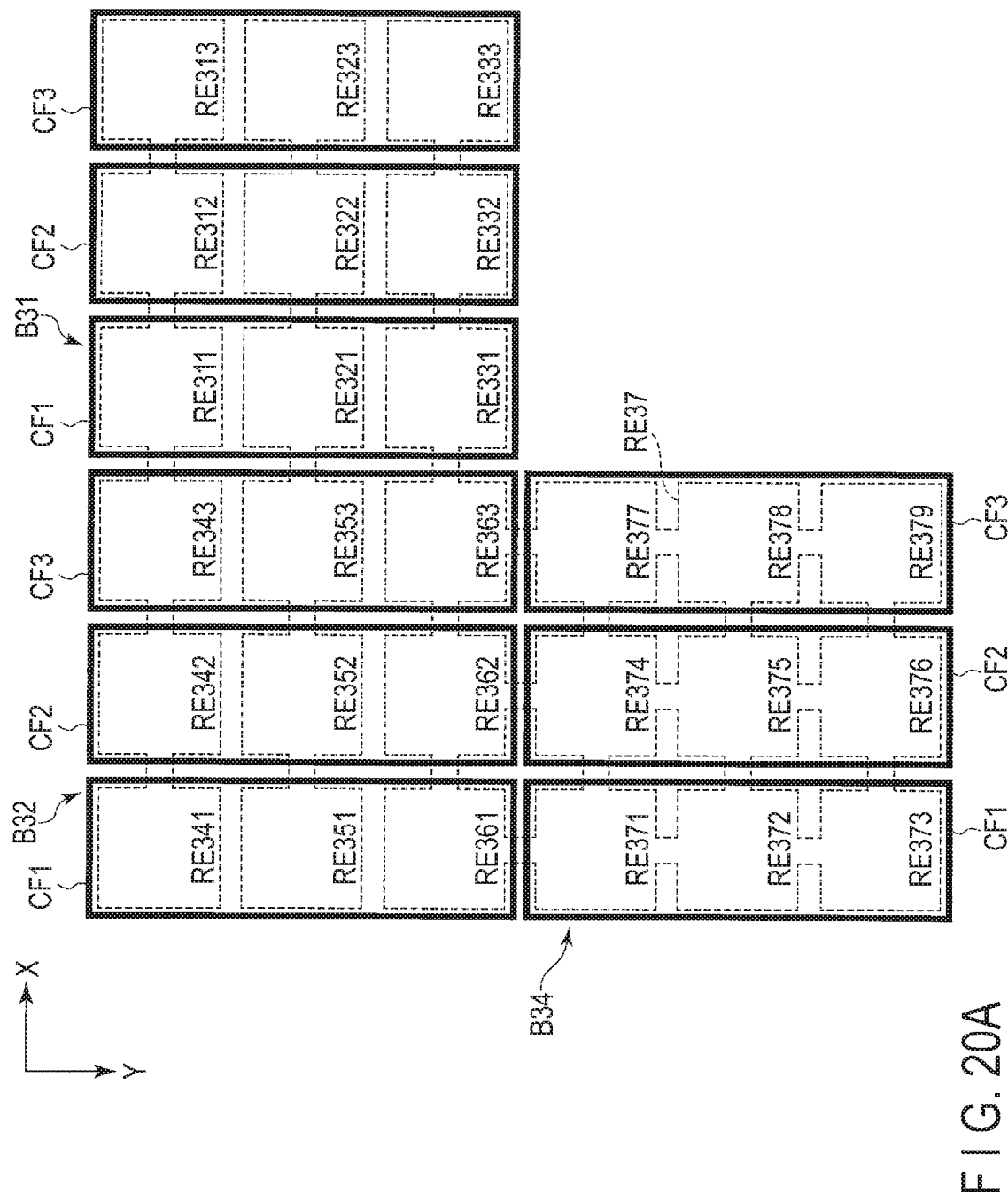
FIG. 20A is a plan view showing a configuration example of the corner portion CN shown in FIG. 2.

FIG. 20A is a plan view showing a configuration example of the corner portion CN shown in FIG. 2, and is a figure for explaining the positional relationship between the reflective electrode and the color filter in the pixel blocks B31, B32, and B34. In the example illustrated in FIG. 20A, the pixel block B31 corresponds to the first pixel block, the pixel block B32 corresponds to the second pixel block, and the pixel block B34 corresponds to the third pixel block.

The pixel blocks B31 and B32 are adjacent to each other in the first direction X, and the pixel blocks B32 and B34 are adjacent to each other in the second direction Y.

Though not described in detail, the pixel block B31 is structured similarly to the pixel block B11 shown in FIG. 17, and includes the pixel circuits not shown, and reflective electrodes RE311 to RE313, RE321 to RE323, and RE331 to RE333. Though not described in detail, the pixel block B32 is structured similarly to the pixel block B12 shown in FIG. 17, and includes reflective electrodes RE341 to RE343, RE351 to RE353, and RE361 to RE363.

The pixel block B34 includes reflective electrodes RE371 to RE379. The reflective electrodes RE371 to RE379 function as a substantially single reflective electrode RE37 as the electrodes adjacent to one another in the first direction X and the second direction Y are mutually connected. The reflective electrode RE374 is connected to the reflective electrode RE362 corresponding to the most significant bit in the adjacent pixel block B32.

In the pixel block B34, the color filter CF1 is opposed to the reflective electrodes RE371 to RE373, the color filter CF2 is opposed to the reflective electrodes RE374 to RE376, and the color filter CF3 is opposed to the reflective electrodes RE377 to RE379.

Note that the pixel blocks B35 and B36 are structured similarly to the pixel block B34.

According to such a configuration example, in the pixel block B34 not including the pixel circuits, since the reflective electrode RE37 is connected to the reflective electrode RE362 corresponding to the most significant bit in the adjacent pixel block B32, the reflective electrode RE37 is driven similarly to the reflective electrode RE362. That is, the pixel block B34 can implement one-bit gradation display in accordance with the most significant bit of the pixel block B32.

Figure 20B:
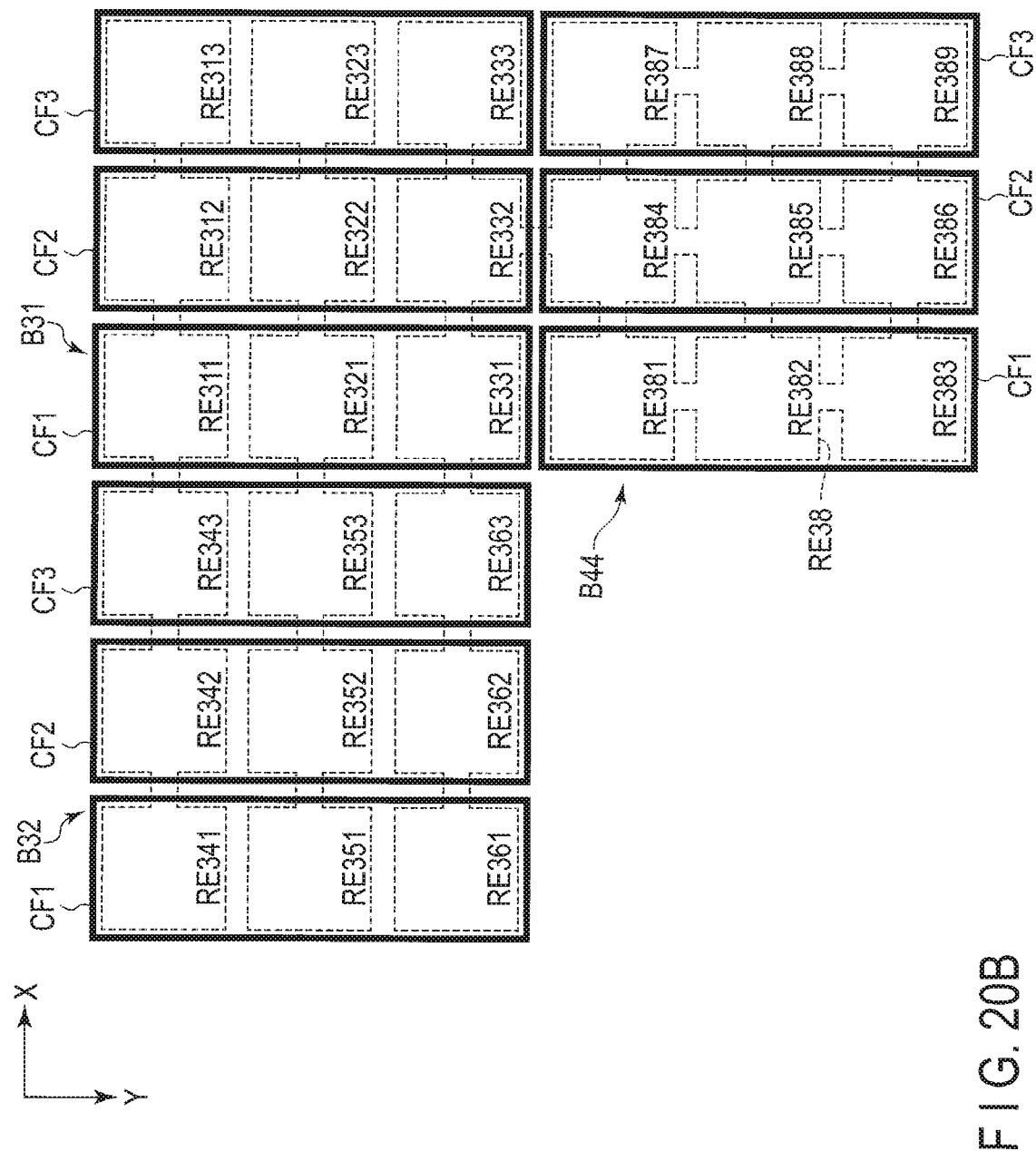
FIG. 20B is a plan view showing another configuration example of the corner portion CN shown in FIG. 2.

FIG. 20B is a plan view showing another configuration example of the corner portion CN shown in FIG. 2, and is a figure for explaining the positional relationship between the reflective electrode and the color filter in the pixel blocks B31, B32, and B44. Note that in the example illustrated in FIG. 2, the pixel block B44 is connected to the pixel block B42. However, in this example, it is assumed that the pixel block B44 is connected to the pixel block B31. In the example illustrated in FIG. 20B, the pixel block B31 corresponds to the first pixel block, the pixel block B32 corresponds to the second pixel block, and the pixel block B44 corresponds to the third pixel block.

The pixel blocks B31 and B32 are adjacent to each other in the first direction X, and the pixel blocks B31 and B44 are adjacent to each other in the second direction Y. Explanation of the pixel blocks B31 and B32 is omitted.

The pixel block B44 includes the reflective electrodes RE381 to RE389. The reflective electrodes RE381 to RE389 function as a substantially single reflective electrode RE38 as the electrodes adjacent to one another in the first direction X and the second direction Y are mutually connected. The reflective electrode RE384 is electrically connected to a reflective electrode RE332 corresponding to the most significant bit in the adjacent pixel block B31.

In the pixel block B44, the color filter CF1 is opposed to the reflective electrodes RE381 to RE383, the color filter CF2 is opposed to the reflective electrodes RE384 to RE386, and the color filter CF3 is opposed to the reflective electrodes RE387 to RE389.

Note that the pixel blocks B45 and B46 are structured similarly to the pixel block B44.

Also in this configuration example, the same advantages as those of the configuration example shown in FIG. 20A can be obtained.

Figure 21:
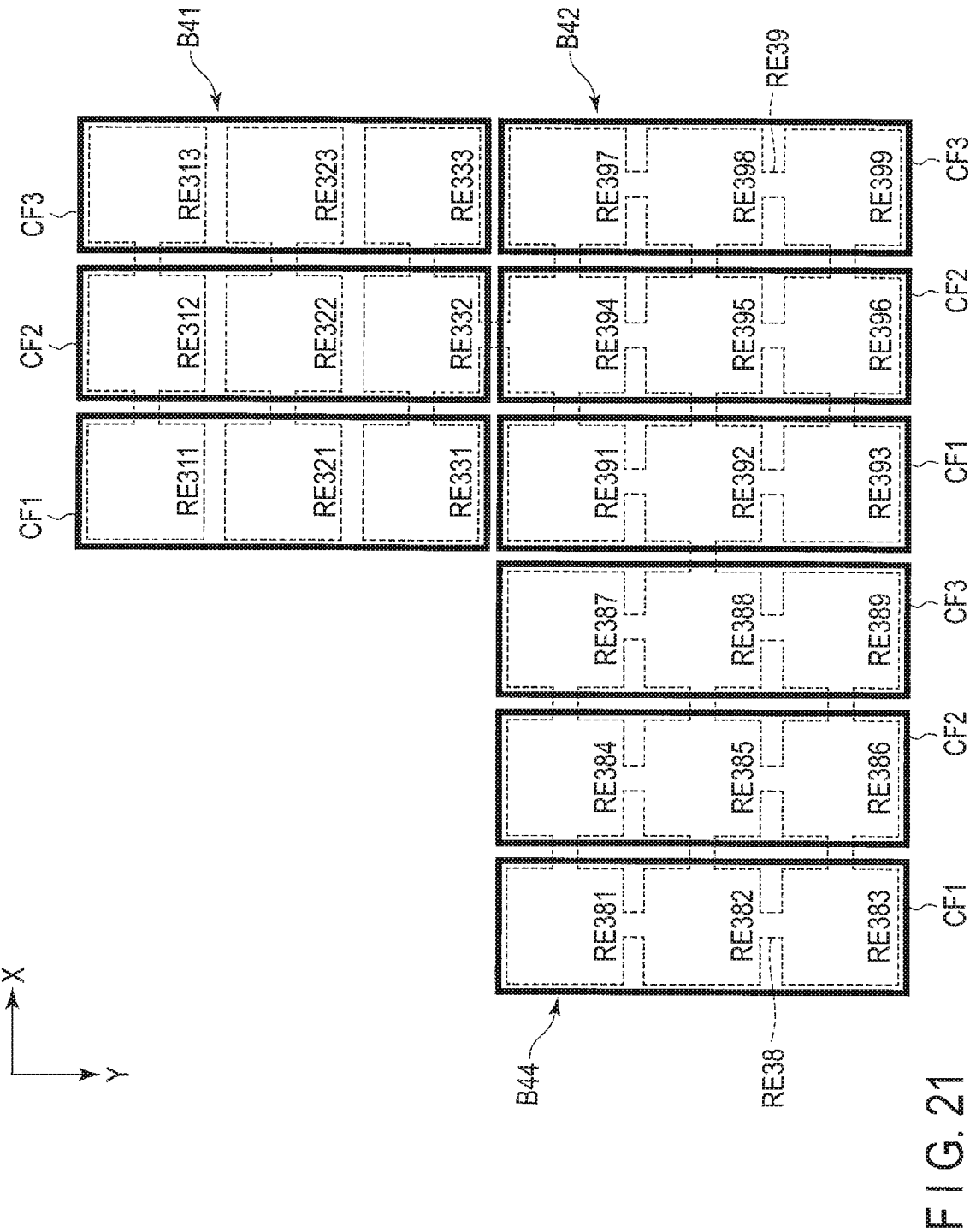
FIG. 21 is a plan view showing yet another configuration example of the corner portion CN shown in FIG. 2.

FIG. 21 is a plan view showing yet another configuration example of the corner portion CN shown in FIG. 2, and is a figure for explaining the positional relationship between the reflective electrode and the color filter in the pixel blocks B41, B42, and B44. In the example illustrated in FIG. 21, the pixel block B41 corresponds to the first pixel block, the pixel block B42 corresponds to the second pixel block, and the pixel block B44 corresponds to the third pixel block.

The pixel blocks B41 and B42 are adjacent to each other in the second direction Y, and the pixel blocks B42 and B44 are adjacent to each other in the first direction X.

Though not described in detail, the pixel block B41 is structured similarly to the pixel block B31 shown in FIG. 20A, and includes the reflective electrodes RE311 to RE313, RE321 to RE323, and RE331 to RE333.

The pixel block B44 includes the reflective electrodes RE381 to RE389. The reflective electrodes RE381 to RE389 function as a substantially single reflective electrode RE38 as the electrodes adjacent to one another in the first direction X and the second direction Y are mutually connected.

The pixel block B42 includes reflective electrodes RE391 to RE399. The reflective electrodes RE391 to RE399 function as a substantially single reflective electrode RE39 as the electrodes adjacent to one another in the first direction X and the second direction Y are mutually connected.

The reflective electrode RE394 is electrically connected to the reflective electrode RE332 corresponding to the most significant bit in the adjacent pixel block B41. The reflective electrode RE388 is electrically connected to the reflective electrode RE392.

In the pixel block B42, the color filter CF1 is opposed to the reflective electrodes RE391 to RE393, the color filter CF2 is opposed to the reflective electrodes RE394 to RE396, and the color filter CF3 is opposed to the reflective electrodes RE397 to RE399. In the pixel block B44, the color filter CF1 is opposed to the reflective electrodes RE381 to RE383, the color filter CF2 is opposed to the reflective electrodes RE384 to RE386, and the color filter CF3 is opposed to the reflective electrodes RE387 to RE389.

Also in this configuration example, the same advantages as those of the configuration example shown in FIG. 20A can be obtained.

Embodiment 3

In the present embodiment, application examples of the display devices DSP explained in Embodiments 1 and 2 will be described.

Figure 22:
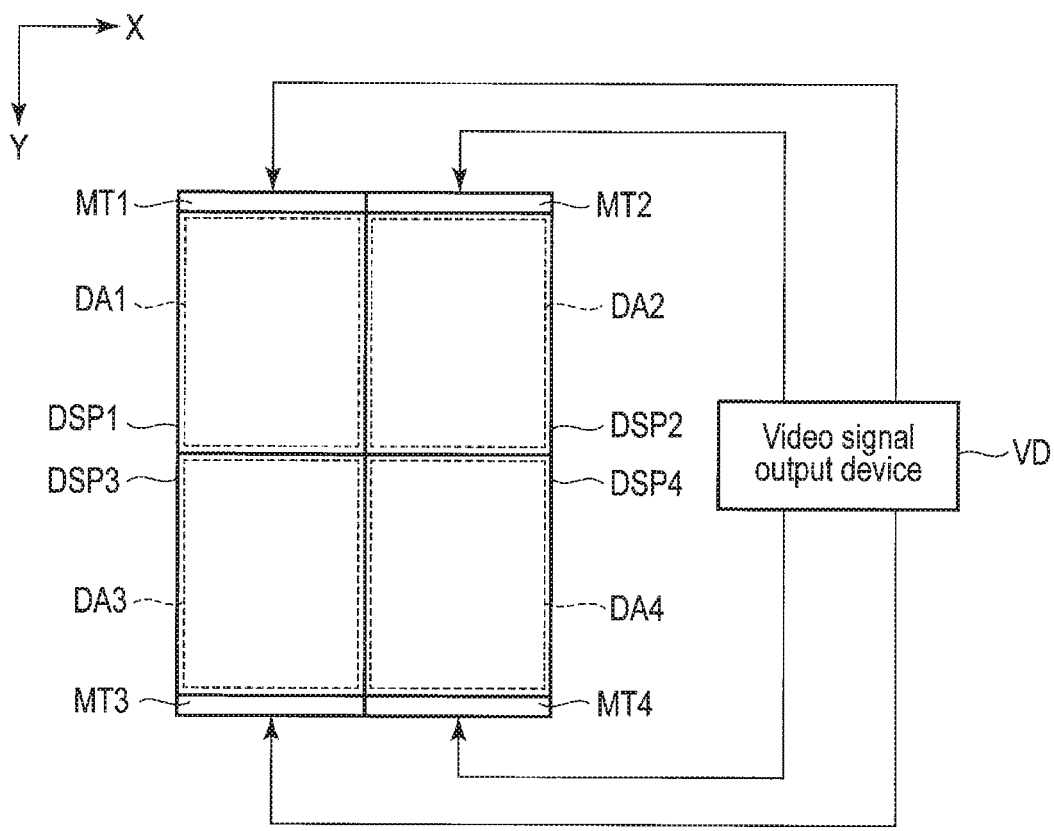
FIG. 22 is an illustration showing a configuration example of a multi-display system.

FIG. 22 is an illustration showing a configuration example of a multi-display system. The multi-display system illustrated in the drawing comprises a video signal output device VD, and display devices DSP1 to DSP4. The video signal output device VD is connected to each of the display devices DSP1 to DSP4 via a cable. Each of the display devices DSP1 to DSP4 is structured to be the same as the display device DSP of the present embodiments described above. The display devices DSP1 to DSP4 include display areas DA1 to DA4, and mounting portions MT1 to MT4, respectively.

In the example illustrated, the display devices DSP1 to DSP4 are arranged in such a way that their respective mounting portions are not disposed between the adjacent display devices. That is, the display devices DSP1 and DSP2 are arranged in the first direction X, the display devices DSP3 and DSP4 are arranged in the first direction X, the display devices DSP1 and DSP3 are arranged in the second direction Y, and the display devices DSP2 and DSP4 are arranged in the second direction Y. However, the display devices DSP1 and DSP3 are arranged such that their display areas DA1 and DA3 are adjacent to each other, and neither the mounting portion MT1 nor MT3 is arranged between the display areas DA1 and DA3. Similarly, the display devices DSP2 and DSP4 are arranged such that their display areas DA2 and DA4 are adjacent to each other.

According to such a configuration example, the display areas DA1 to DA4 of the display devices DSP1 to DSP4 are adjacent to each other in close proximity. Further, since a narrower frame structure is achieved in each of the display devices DSP1 to DSP4 as described above, an interval between the adjacent display areas in the display areas DA1 to DA4 can be reduced. Accordingly, discontinuity of a display image between the display areas in the display areas DA1 to DA4 can be made hard to be visually recognized, and the display quality can be improved.

As described above, according to the present embodiment, a display device with a narrower frame structure can be provided.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

An example of the display device which can be obtained from the structure disclosed in the present specification is noted as follows:

(1) A display device comprising:
at least a main pixel comprising a plurality of sub-pixels which exhibit different colors, respectively;
a first pixel block adjacent to the main pixel;
a second pixel block adjacent to the first pixel block, and electrically connected to the first pixel block; and
a driver which drives the main pixel and the first pixel block, in which
the main pixel, the first pixel block, and the second pixel block are located in a display area which displays an image, in which:
the display area includes an outer edge portion,
the first pixel block is closer to the outer edge portion than the main pixel is, and the second pixel block is closer to the outer edge portion than the first pixel block is, and
the second pixel block overlaps the driver in planar view.

(2) The display device of (1), in which:
the first pixel block comprises a pixel circuit, and a first reflective electrode electrically connected to the pixel circuit; and
the second pixel block comprises a second reflective electrode electrically connected to the first reflective electrode.

(3) The display device of (1), in which:
the first pixel block comprises a first pixel circuit, a second pixel circuit, a first reflective electrode electrically connected to the first pixel circuit, and a second reflective electrode electrically connected to the second pixel circuit; and
the second pixel block comprises a third reflective electrode electrically connected to the first reflective electrode, and a fourth reflective electrode electrically connected to the second reflective electrode.

(4) The display device of (3), in which an area of the second reflective electrode is greater than an area of the first reflective electrode.

(5) The display device of (4), in which an area of the fourth reflective electrode is greater than an area of the third reflective electrode.

(6) The display device of (3), further comprising a third pixel block which is adjacent to the second pixel block in the display area, and is electrically connected to the second pixel block, in which:
the third pixel block, the second pixel block, and the first pixel block are arranged along a single direction;
the third pixel block is closer to the outer edge portion than the second pixel block is;
the third pixel block comprises a fifth reflective electrode electrically connected to the fourth reflective electrode; and
an area of the fourth reflective electrode is greater than an area of the third reflective electrode.

(7) The display device of (3), further comprising a third pixel block which is adjacent to the second pixel block in the display area, and is electrically connected to the second pixel block, in which:
the second pixel block is adjacent to the first pixel block along a first direction, and the third pixel block is adjacent to the second pixel block along a second direction intersecting the first direction;
the third pixel block comprises a fifth reflective electrode electrically connected to the fourth reflective electrode; and
an area of the fourth reflective electrode is greater than an area of the third reflective electrode.

(8) The display device of (7), in which the fourth reflective electrode is closer to the fifth reflective electrode than the third reflective electrode is.

(9) The display device of (3), further comprising a third pixel block which is adjacent to the first pixel block in the display area, and is electrically connected to the first pixel block, in which:
the second pixel block is adjacent to the first pixel block along a first direction, and the third pixel block is adjacent to the first pixel block along a second direction intersecting the first direction;
the third pixel block comprises a fifth reflective electrode electrically connected to the second reflective electrode; and
an area of the second reflective electrode is greater than an area of the first reflective electrode.

(10) The display device of (9), in which the second reflective electrode is closer to the fifth reflective electrode than the first reflective electrode is.

(11) The display device of (3), in which each of the first pixel circuit and the second pixel circuit comprises a memory portion capable of holding data corresponding to binary gradation.

(12) The display device of (3), in which:
the first reflective electrode is located at a central portion of the first pixel block;
the second reflective electrode is located outside the first reflective electrode, and comprises an opening adjacent to the second pixel block; and
the first reflective electrode is electrically connected to the third reflective electrode through the opening.

(13) The display device of (3), in which:
the first reflective electrode is located at a central portion of the first pixel block;
the second reflective electrode is located outside the first reflective electrode, and comprises a first opening adjacent to the second pixel block;
the third reflective electrode is located at a central portion of the second pixel block;
the fourth reflective electrode is located outside the third reflective electrode, and comprises a second opening adjacent to the first opening; and
the display device further comprises a connection portion which is located in the first opening and the second opening, and electrically connects the first reflective electrode and the third reflective electrode to each other.

(14) The display device of (1), further comprising:
a first substrate comprising the driver;
a second substrate opposed to the first substrate; and
a seal which bonds the first substrate and the second substrate to each other, in which:
the driver is located at an inner side surrounded by the seal; and
the second pixel block is located closer to the seal than the first pixel block is.

(15) The display device of (14), in which the second substrate comprises a light-shielding layer at a position which overlaps the seal, and does not overlap the second pixel block.

(16) The display device of (14), further comprising at least a dummy electrode which is electrically connected to a power line of a constant potential between the outer edge portion and the seal.

What is claimed is:

1. A display device comprising:
at least a main pixel comprising a plurality of sub-pixels which exhibit different colors, respectively;
a first pixel block adjacent to the main pixel;
a second pixel block adjacent to the first pixel block, and electrically connected to the first pixel block;
a first light-shielding layer;
a second light-shielding layer; and
a driver which drives the main pixel and the first pixel block,
the display device is a reflective liquid crystal display device without any backlighting,
wherein:
the main pixel, the first pixel block, and the second pixel block are located in a display area, a display area is configured to display an image, the display area includes an outer edge portion,
the first pixel block comprises
a first pixel circuit,
a first reflective electrode that is electrically connected to the first pixel circuit,
a second pixel circuit, and
a second reflective electrode that is electrically connected to the second pixel circuit,
the first pixel block does not overlap the driver in a planar view of the display device, and is closer to the outer edge portion than the main pixel,
the second pixel block comprises
a third reflective electrode that is electrically connected to the first pixel circuit via the first reflective electrode, and
a fourth reflective electrode that is electrically connected to the second pixel circuit via the second reflective electrode,
the second pixel block overlaps the driver in the planar view, is closer to the outer edge portion than the first pixel block, and does not comprise any pixel circuit,
the main pixel includes a plurality of reflective electrodes,
the first light-shielding layer overlaps an area between the reflective electrodes adjacent to each other in a first direction and an area between the reflective electrodes adjacent to each other in a second direction intersecting the first direction, and
the second light-shielding layer surrounds the first pixel block and the second pixel block.

2. The display device according to claim 1, wherein an area of the second reflective electrode is greater than an area of the first reflective electrode.

3. The display device according to claim 2, wherein an area of the fourth reflective electrode is greater than an area of the third reflective electrode.

4. The display device according to claim 1, further comprising a third pixel block which is adjacent to the second pixel block in the display area, and is electrically connected to the second pixel block, wherein:
the third pixel block, the second pixel block, and the first pixel block are arranged along a single direction;
the third pixel block is closer to the outer edge portion than the second pixel block is;
the third pixel block comprises a fifth reflective electrode electrically connected to the fourth reflective electrode; and
an area of the fourth reflective electrode is greater than an area of the third reflective electrode.

5. The display device according to claim 1, further comprising a third pixel block which is adjacent to the second pixel block in the display area, and is electrically connected to the second pixel block, wherein:
the second pixel block is adjacent to the first pixel block along a first direction, and the third pixel block is adjacent to the second pixel block along a second direction intersecting the first direction;

the third pixel block comprises a fifth reflective electrode electrically connected to the fourth reflective electrode; and an area of the fourth reflective electrode is greater than an area of the third reflective electrode.

6. The display device according to claim 5, wherein the fourth reflective electrode is closer to the fifth reflective electrode than the third reflective electrode is.

7. The display device according to claim 1, further comprising a third pixel block which is adjacent to the first pixel block in the display area, and is electrically connected to the first pixel block, wherein:

the second pixel block is adjacent to the first pixel block along a first direction, and the third pixel block is adjacent to the first pixel block along a second direction intersecting the first direction;

the third pixel block comprises a fifth reflective electrode electrically connected to the second reflective electrode; and an area of the second reflective electrode is greater than an area of the first reflective electrode.

8. The display device according to claim 7, wherein the second reflective electrode is closer to the fifth reflective electrode than the first reflective electrode is.

9. The display device according to claim 1, wherein each of the first pixel circuit and the second pixel circuit comprises a memory portion capable of holding data corresponding to binary gradation.

10. The display device according to claim 1, wherein:

the first reflective electrode is located at a central portion of the first pixel block;

the second reflective electrode is located outside the first reflective electrode, and comprises an opening adjacent to the second pixel block; and the first reflective electrode is electrically connected to the third reflective electrode through the opening.

11. The display device according to claim 1, wherein:

the first reflective electrode is located at a central portion of the first pixel block;

the second reflective electrode is located outside the first reflective electrode, and comprises a first opening adjacent to the second pixel block;

the third reflective electrode is located at a central portion of the second pixel block;

the fourth reflective electrode is located outside the third reflective electrode, and comprises a second opening adjacent to the first opening; and the display device further comprises a connection portion which is located in the first opening and the second opening, and electrically connects the first reflective electrode and the third reflective electrode to each other.

12. The display device according to claim 1, further comprising:

a first substrate comprising the driver;

a second substrate opposed to the first substrate; and a seal which bonds the first substrate and the second substrate to each other, wherein:

the driver is located at an inner side surrounded by the seal; and the second pixel block is located closer to the seal than the first pixel block is.

13. The display device according to claim 12, wherein the second substrate comprises a light-shielding layer at a position which overlaps the seal and does not overlap the second pixel block.

14. The display device according to claim 12, further comprising:

at least a dummy electrode which is electrically connected to a power line of a constant potential between the outer edge portion and the seal.

15. The display device according to claim 1, further comprising:

a first substrate comprising the driver;

a second substrate opposed to the first substrate;

a liquid crystal layer held between the first substrate and the second substrate; and a seal which bonds the first substrate and the second substrate to each other, wherein:

the second substrate comprises a light-shielding layer at a position which overlaps the seal; and the light-shielding layer has an inner peripheral portion between the second pixel block and the seal in the planar view.

16. The display device according to claim 15, wherein the inner peripheral portion overlaps the driver in the planar view.

17. The display device according to claim 1, further comprising:

a first substrate comprising the driver;

a second substrate opposed to the first substrate;

a liquid crystal layer held between the first substrate and the second substrate; and a seal which bonds the first substrate and the second substrate to each other, wherein the first pixel block is located between the main pixel and the second pixel block, and the second pixel block is located between the first pixel block and the seal in the planar view.

18. A display device comprising:

a main pixel with a pixel circuit and a reflective pixel electrode electrically connected to the pixel circuit;

a first pixel block with a first pixel circuit and a first reflective pixel electrode electrically connected to the first pixel circuit;

a second pixel block with a second reflective pixel electrode electrically connected to the first reflective pixel electrode, the second pixel block not including any pixel circuits; and a driver driving the main pixel and the first pixel block, wherein the main pixel, the first pixel block, and the second pixel block are located in a display area displaying an image, the display area includes an outer edge portion, the second pixel block is located between the outer edge portion and the first pixel block in a planar view, the first pixel block does not overlap the driver in the planar view, the second pixel block overlaps the driver in the planar view, the second reflective pixel electrode is electrically connected to the first pixel circuit via the first reflective pixel electrode.

* * * * *